United States Patent
Talebi Fard et al.

(10) Patent No.: US 10,536,925 B2
(45) Date of Patent: Jan. 14, 2020

(54) PAGING FOR MASSIVE MTC

(71) Applicant: Telefonaktiebolaget LM Ericsson (publ), Stockholm (SE)

(72) Inventors: Peyman Talebi Fard, Vancouver (CA); Catherine Truchan, Lorraine (CA); Stere Preda, Longueuil (CA); Suresh Krishnan, Suwanee, GA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/311,921

(22) PCT Filed: Jun. 28, 2016

(86) PCT No.: PCT/US2016/039844
§ 371 (c)(1),
(2) Date: Dec. 20, 2018

(87) PCT Pub. No.: WO2018/004541
PCT Pub. Date: Jan. 4, 2018

(65) Prior Publication Data
US 2019/0215799 A1    Jul. 11, 2019

(51) Int. Cl.
*H04W 68/02* (2009.01)
*H04W 4/70* (2018.01)
(Continued)

(52) U.S. Cl.
CPC .......... *H04W 68/02* (2013.01); *H04W 4/70* (2018.02); *H04W 76/27* (2018.02); *H04W 76/28* (2018.02)

(58) Field of Classification Search
CPC ....... H04W 68/02; H04W 4/70; H04W 76/28; H04W 76/27
See application file for complete search history.

(56) References Cited

U.S. PATENT DOCUMENTS

| 2012/0076085 | A1 | 3/2012 | Chou |
| 2013/0194998 | A1 | 8/2013 | Susitaival et al. |
| 2018/0234919 | A1* | 8/2018 | Tsuda .................... H04W 8/005 |

FOREIGN PATENT DOCUMENTS

| EP | 2369883 A1 | 9/2011 |
| KR | 20140103490 A | 8/2014 |

(Continued)

OTHER PUBLICATIONS

Author Unknown, "Technical Specification Group Services and System Aspects; Architecture enhancements to facilitate communications with packet data networks and applications (Release 13)," Technical Specification 23.682, Version 13.5.0, 3GPP Organizational Partners, Mar. 2016, 90 pages.

(Continued)

*Primary Examiner* — Minjung Kim
(74) *Attorney, Agent, or Firm* — Withrow & Terranova, PLLC

(57) ABSTRACT

Systems and methods relating to scheduling Paging Occasions (POs) are disclosed. Embodiments of a method of operation of a network node are disclosed. In some embodiments, the method of operation of a network nodes comprises assigning POs to a plurality of User Equipments (UEs) in accordance with one or more anti-affinity groups such that, for a defined time interval, POs within the defined time interval are assigned to UEs in a same anti-affinity group. The method further comprises notifying the plurality of UEs of the POs assigned to the UEs. In this manner, the expected maximum number of pages within the defined time interval is substantially reduced.

19 Claims, 16 Drawing Sheets

(51) Int. Cl.
*H04W 76/27* (2018.01)
*H04W 76/28* (2018.01)

(56) References Cited

FOREIGN PATENT DOCUMENTS

| WO | 2008022782 A1 | 2/2008 |
|---|---|---|
| WO | 2013007193 A1 | 1/2013 |
| WO | 2014181981 A1 | 11/2014 |
| WO | 2015067307 A1 | 5/2015 |

OTHER PUBLICATIONS

Author Unknown, "Technical Specification Group Core Network and Terminals; Mobile radio interface Layer 3 specification; Core network protocols; Stage 3 (Release 13)," Technical Specification 24.008, Version 13.5.0, 3GPP Organizational Partners, Mar. 2016, 740 pages.

Author Unknown, "Technical Specification Group Core Network and Terminals; Non-Access-Stratum (NAS) protocol for Evolved Packet System (EPS); Stage 3 (Release 13)," Technical Specification 24.301, Version 13.5.0, 3GPP Organizational Partners, Mar. 2016, 414 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Technical Specification 36.300, Version 13.1.0, 3GPP Organizational Partners, Sep. 2015, 254 pages.

Author Unknown, "Technical Specification Group Radio Access Network; Evolved Universal Terrestrial Radio Access (E-UTRA); User Equipment (UE) procedures in idle mode (Release 13)," Technical Specification 36.304, Version 13.0.0, 3GPP Organizational Partners, Dec. 2015, 42 pages.

Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.1.0, 3GPP Organizational Partners, Mar. 2016, 551 pages.

Zte, "R2-111916: Backoff enhancements for RAN overload control," Third Generation Partnership Project (3GPP), TSG RAN WG2 #73bis, Apr. 11-15, 2011, 7 pages, Shanghai, China.

Invitation to Pay Additional Fees and Partial Search for International Application No. PCT/US2016/039844, dated Feb. 20, 2017, 6 pages.

International Search Report and Written Opinion for International Patent Application No. PCT/US2016/039844, dated Apr. 12, 2017, 15 pages.

Written Opinion for International Patent Application No. PCT/US2016/039844, dated Jun. 20, 2018, 6 pages.

International Preliminary Report on Patentability for International Patent Application No. PCT/US2016/039844, dated Oct. 4, 2018, 8 pages.

Notification of Reason for Refusal for Korean Patent Application No. 10-2019-7002700, dated Sep. 6, 2019, 8 pages.

\* cited by examiner

PAGING FOR MASSIVE MTC

This application is a 35 U.S.C. § 371 national phase filing of International Application No. PCT/US2016/039844, filed Jun. 28, 2016, the disclosure of which is incorporated herein by reference in its entirety.

TECHNICAL FIELD

The present disclosure relates to paging in a cellular communications network.

BACKGROUND

Long Term Evolution (LTE)

Third Generation Partnership Project (3GPP) LTE uses Orthogonal Frequency Division Multiplexing (OFDM) in the downlink and Discrete Fourier Transform (DFT)-spread OFDM (also referred to as single-carrier Frequency Division Multiple Access (FDMA)) in the uplink. The basic LTE downlink physical resource can thus be seen as a time-frequency grid, where each resource element corresponds to one OFDM subcarrier during one OFDM symbol interval. The uplink subframe has the same subcarrier spacing as the downlink and the same number of Single Carrier FDMA (SC-FDMA) symbols in the time domain as OFDM symbols in the downlink.

In the time domain, LTE downlink transmissions are organized into radio frames of 10 milliseconds (ms), each radio frame consisting of ten equally-sized subframes of length $T_{SUBFRAME}=1$ ms. Each subframe comprises two slots of duration 0.5 ms each, and the slot numbering within a frame ranges from 0 to 19. For normal Cyclic Prefix (CP), one subframe consists of 14 OFDM symbols. The duration of each symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Paging

When a User Equipment device (UE) is in RRC_IDLE (i.e., Idle mode), paging is used by the network to initiate connection setup. When in RRC_IDLE, the UE operates according to a configured Discontinuous Reception (DRX) cycle. DRX in the RRC_IDLE state enables the UE to monitor a certain radio subframe for a paging message as opposed to monitoring every subframe. For this purpose, different groups of UEs monitor a certain subframe for a paging message. More specifically, a Paging Frame (PF) is a radio frame that includes multiple Paging Occasions (POs). One PO is one subframe (i.e., 1 ms) within the PF. Each DRX cycle may contain only one PO for a certain UE.

In operation, a UE calculates its PF and PO index (i.e., index to one of the multiple POs within its PF) based on the International Mobile Subscriber Identity (IMSI) of the UE and other parameters, as specified in 3GPP Technical Specification (TS) 36.304 V13.0.0. Once the UE knows its PF and PO, when operating in RRC_IDLE, the UE wakes up from DRX to listen for a paging message in its PO within its PF. In particular, during its PO, the UE blindly decodes a common search space for a Physical Downlink Control Channel (PDCCH) with a Paging Radio Network Temporary Identifier (P-RNTI) computed by the UE based on the IMSI of the UE as well as a cell-specific and, optionally, a terminal-specific paging cycle. If the UE finds a PDCCH with its P-RNTI, the UE decodes the PDCCH to obtain an indication of the Physical Downlink Shared Channel (PDSCH) resources for a respective Paging Channel (PCH). The UE then processes the paging message transmitted on the PCH. The paging message includes the identity of the UE(s) being paged. If the UE finds its identity in the paging message, then the UE determines that it has been paged, and the UE then transitions from RRC_IDLE to RRC_CONNECTED. If the UE does not find its identity in the paging message, the UE determines that it has not been paged and, as such, the UE discards the paging message and remains in RRC_IDLE.

The aforementioned paging process works well for conventional UEs. However, for massive deployments of Machine Type Communication (MTC) devices (also referred to herein as MTC UEs), the conventional paging process may result in a paging flood. In particular, the conventional mechanisms for assigning UEs to PFs and POs based on the IMSIs of the UEs does not guarantee that many UEs (e.g., many MTC UEs) are assigned POs that are close proximity in time (e.g., in the same PF). If many MTC UEs are assigned POs in close proximity to one another and if the MTC UEs are likely to be paged at the same time (e.g., sensors of the same type that are periodically paged to obtain sensor readings), then the conventional mechanism for assigning UEs to POs may result in a page flood. Thus, there is a need for a paging mechanism that mitigates the chances of a page flood, particularly for (but not limited to) massive deployments of MTC UEs.

SUMMARY

Systems and methods relating to scheduling Paging Occasions (POs) are disclosed. Embodiments of a method of operation of a network node are disclosed. In some embodiments, the method of operation of a network nodes comprises assigning POs to a plurality of User Equipments (UEs) in accordance with one or more anti-affinity groups such that, for a defined time interval, POs within the defined time interval are assigned to UEs in a same anti-affinity group. The method further comprises notifying the plurality of UEs of the POs assigned to the UEs. In this manner, the expected maximum number of pages within the defined time interval is substantially reduced.

In some embodiments, the plurality of UEs are assigned to a plurality of affinity groups such that each UE is assigned to one of the plurality of affinity groups and each affinity group of the plurality of affinity groups comprises one or more of the plurality of UEs. Each anti-affinity group of the one or more anti-affinity groups is a group of N affinity groups of the plurality of affinity groups such that, over a defined time interval, the anti-affinity group satisfies the following:

$$\sum_{i=1}^{N} N_i P(g_i \mid g_{N_i}) < A \sum_{i=1}^{N} N_i$$

where N is a number of affinity groups in the anti-affinity group, $N_i$ is a number of POs assigned to the i-th affinity group within the defined time interval, $P(g_i|g_{N_i})$ is a probability of a paging message in the defined time interval for the i-th affinity group given that a paging message for any of the other N affinity groups also occurs in the defined time interval, and A is an anti-affinity threshold and is less than 1. In some embodiments, the anti-affinity threshold is less than or equal to 0.9. In some embodiments, the anti-affinity threshold is less than or equal to 0.75. In some embodiments, the anti-affinity threshold is less than or equal to 0.5.

In some embodiments, the defined time interval is n times a Discontinuous Reception (DRX) ON duration that is common for the plurality of UEs, and n≥1.

In some embodiments, the plurality of affinity groups are based on one or more attributes related to the plurality of UEs. In some embodiments, the one or more attributes comprise at least one of a group consisting of: traffic arrival distribution function, one or more traffic arrival parameters, network characteristics, network capabilities, device type, device capabilities, Machine Type Communication (MTC) application, and device mobility characteristics.

In some embodiments, the method further comprises obtaining profiles and/or capabilities of the plurality of UEs and assigning the plurality of UEs to the plurality of affinity groups based on the profiles and/or capabilities of the plurality of UEs.

In some embodiments, the plurality of UE(s) comprises a plurality of MTC devices.

Embodiments of a network node are also disclosed. In some embodiments, the network node comprises at least one processor, memory storing instructions executable by the at least one processor whereby the network node is operable to assign POs to a plurality of UEs in accordance with one or more anti-affinity groups such that, for a defined time interval, POs within the defined time interval are assigned to UEs in a same anti-affinity group, and notify the plurality of UEs of the POs assigned to the UEs.

In some embodiments, a network node is adapted to assign POs to a plurality of UEs in accordance with one or more anti-affinity groups such that, for a defined time interval, POs within the defined time interval are assigned to UEs in a same anti-affinity group and notify the plurality of UEs of the POs assigned to the UEs.

In some embodiments, a network node comprises an index assigning module operable to assign POs to a plurality of UEs in accordance with one or more anti-affinity groups such that, for a defined time interval, POs in the defined time interval are assigned to UEs within a same anti-affinity group, and a notifying module operable to notify the plurality of UEs of the POs assigned to the UEs.

Embodiments of a method of operation of a UE are also disclosed. In some embodiments, the method of operation of a UE comprises receiving, from a network node, a notification of a PO index assigned to the UE, and monitoring a PO corresponding to the PO index within a Paging Frame (PF).

Embodiments of a UE are also disclosed. In some embodiments, a UE comprises at least one receiver, at least one processor, and memory storing instructions executable by the at least one processor whereby the UE is operable to receive, from a network node via the at least one receiver, a notification of a PO index assigned to the UE, and monitor, via the at least one receiver, a PO corresponding to the PO index within a PF.

In some embodiments, a UE is adapted to receive, from a network node, a notification of a PO index assigned to the UE, and monitor a PO corresponding to the PO index within a PF.

In some embodiments, a UE comprises a notification receiving module operable to receive, from a network node, a notification of a PO index assigned to the UE, and a monitoring module operable to monitor a PO corresponding to the PO index within a PF.

In some embodiments, a method of operation of a network node comprises dynamically scheduling POs for a plurality of UEs based on a predefined maximum number of POs per PF and/or a predefined number of PFs per DRX awake period and notifying the plurality of UEs of the POs dynamically scheduled for the plurality of UEs.

In some embodiments, the plurality of UEs are assigned to a plurality of affinity groups such that each UE of the plurality of UEs is assigned to one of the plurality of affinity groups and each affinity group of the plurality of affinity groups comprises one or more of the plurality of UEs. The plurality of affinity groups are associated with a plurality of DRX configurations such that each affinity group of the plurality of affinity groups is associated with a respective DRX configuration. For each affinity group of the plurality of affinity groups, a predefined maximum number of POs per PF and/or a predefined number of PFs per DRX awake period are associated with the affinity group. Dynamically scheduling POs for the plurality of UEs comprises, for each UE, dynamically scheduling a PO for the UE based on the predefined maximum number of POs per PF associated with the respective affinity group and/or the predefined number of PFs per DRX awake period associated with the respective affinity group.

Further, in some embodiments, dynamically scheduling POs for the plurality of UEs further comprises dynamically scheduling POs for the plurality of UEs such that, for a defined time interval, POs within the defined time interval are assigned to UEs in a same anti-affinity group, wherein the anti-affinity group is a group of N affinity groups of the plurality of affinity groups such that, over a defined time interval, the anti-affinity group satisfies the following:

$$\sum_{i=1}^{N} N_i P(g_i \mid g_{N \setminus i}) < A \sum_{i=1}^{N} N_i$$

where N is a number of affinity groups in the anti-affinity group, $N_i$ is a number of POs assigned to the i-th affinity group within the defined time interval, $P(g_i|g_{N \setminus i})$ is a probability of a paging message in the defined time interval for the i-th affinity group given that a paging message for any of the other N affinity groups also occurs in the defined time interval, and A is an anti-affinity threshold and is less than 1. In some embodiments, the anti-affinity threshold is less than or equal to 0.9. In some embodiments, the anti-affinity threshold is less than or equal to 0.75. In some embodiments, the anti-affinity threshold is less than or equal to 0.5.

In some embodiments, dynamically scheduling POs for a plurality of UEs comprises, for each UE of the plurality of UEs, scheduling a PO for the UE at a first available upcoming PO location subject to the predefined maximum number of POs per PF and/or the predefined number of PFs per DRX awake period associated with the respective affinity group.

In some embodiments, dynamically scheduling POs for a plurality of UEs comprises, for each UE of the plurality of UEs, randomly selecting K upcoming PFs out of N upcoming PFs, where 2≤K<<N, selecting a select PF from the K upcoming PFs based on the predefined maximum number of POs per PF associated with the respective affinity group, and scheduling a PO for the UE in the select PF.

Embodiments of a network node are also disclosed. In some embodiments, a network node comprises at least one processor, memory storing instructions executable by the at least one processor whereby the network node is operable to dynamically schedule POs for a plurality of UEs based on a predefined maximum number of POs per PF and/or a predefined number of PFs per DRX awake period, and notify the plurality of UEs of the POs dynamically scheduled for the plurality of UEs.

In some embodiments, a network node is adapted to dynamically schedule POs for a plurality of UEs based on a predefined maximum number of POs per PF and/or a predefined number of PFs per DRX awake period, and notify the plurality of UEs of the POs dynamically scheduled for the plurality of UEs.

In some embodiments, a network node comprises a PO scheduling module operable to dynamically schedule POs for a plurality of UEs based on a predefined maximum number of POs per PF and/or a predefined number of PFs per DRX awake period, and a notifying module operable to notify the plurality of UEs of the POs dynamically scheduled for the plurality of UEs.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

User Equipment or User Equipment device (UE): As used herein, a "UE" is any type of device that has access to (i.e., is served by) a cellular communications network by wirelessly transmitting and/or receiving signals to a radio access node(s). Some examples of a UE include, but are not limited to, a 3GPP UE and a Machine Type Communication (MTC) device (also referred to herein as a MTC UE).

Network Node: As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Figure 1:
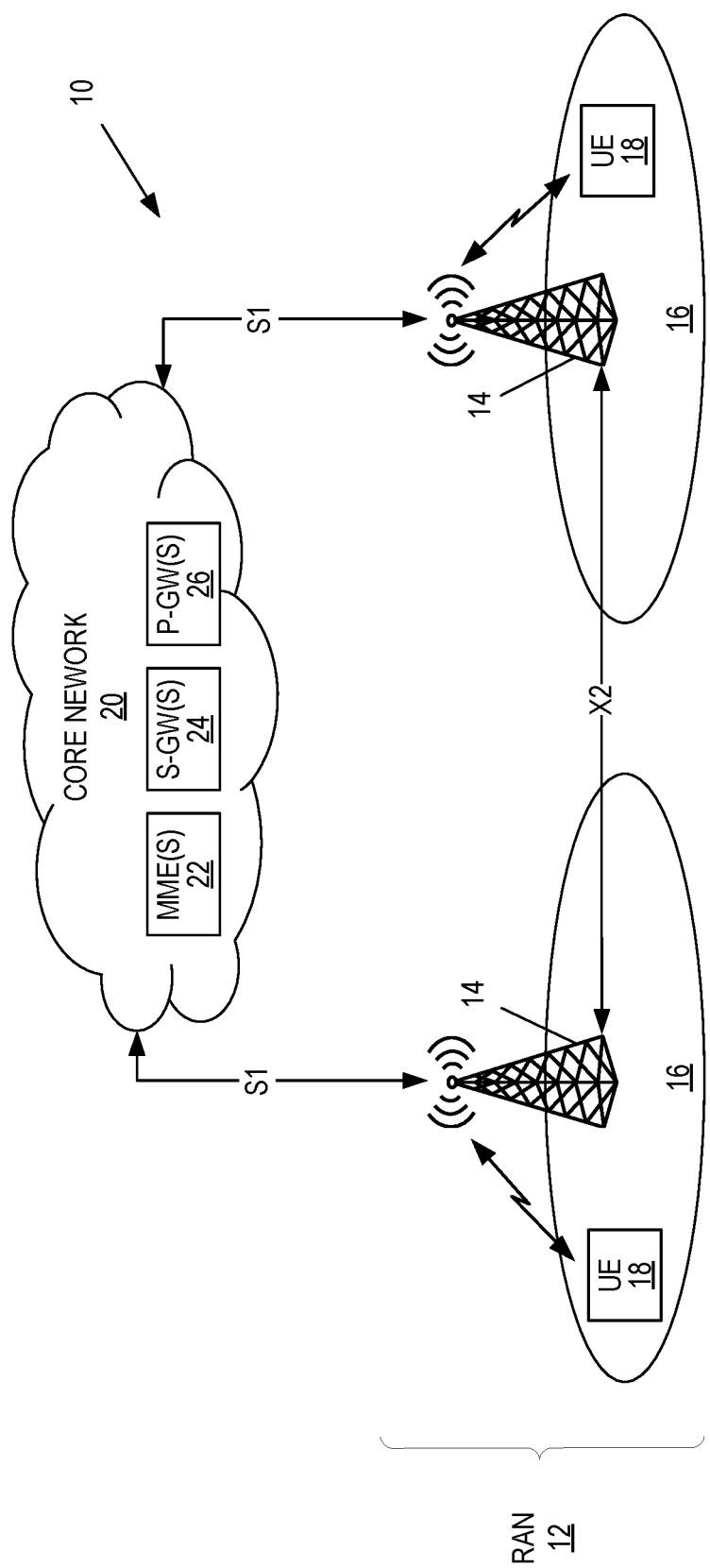
FIG. 1 illustrates one example of a cellular communications network in which embodiments of the present disclosure may be implemented.

Systems and methods relating to paging and, in particular, to assigning Paging Occasions (POs) to UEs in such a manner as to mitigate the chance of a paging flood are disclosed. In this regard, FIG. 1 illustrates one example of a cellular communications network 10 in which embodiments of the present disclosure may be implemented. As illustrated, the cellular communications network 10 includes a Radio Access Network (RAN) 12 that includes a number of base stations 14 serving corresponding cells 16. The base stations 14 may be, for example, eNBs. Note, however, that the RAN 12 may include other types of radio access nodes such as, for example, Remote Radio Heads (RRHs). The base stations 14 provide wireless services to UEs 18. The base stations 14 may communicate via a base-station-to-base-station interface, which for LTE is referred to as an X2 interface. The base stations 14 are connected to a core network 20 that includes various core network nodes such as, for example, MMEs 22, Serving Gateways (S-GWs) 24, and P-GWs 26.

When the UEs 18 are in an IDLE state (e.g., RRC_IDLE state in 3GPP LTE), the base stations 14 can initiate a connection (i.e., a transition from IDLE state to CONNECTED state (e.g., RRC_CONNECTED)) for a UE 18 by paging the UE 18. The conventional paging mechanism in 3GPP LTE requires that the UE 18 wakes upon from Discontinuous Reception (DRX) in order to monitor a defined PO during a defined Paging Frame (PF). For a particular UE 18, when using the conventional paging mechanism in 3GPP LTE, the UE 18 computes the PF and an index of the PO within the PF based on the International Mobile Subscriber Identity (IMSI) of the UE 18.

More specifically, in 3GPP LTE, a UE 18 is paged upon the arrival of a paging request for that UE 18 at the base station 14. The System Frame Number (SFN), PF, and PO in which a paging message is to be transmitted to the UE 18 are determined based on the UE_id of the UE 18, where the UE_id is derived from modulo operations on the IMSI of the UE 18, as described in 3GPP Technical Specification (TS) 36.300 V13.1.0 (2015-09) and 36.304 V13.0.0 (2015-12). Using the conventional paging mechanism in 3GPP LTE, UEs 18 are not prioritized or differentiated based on their purpose or profile type and the same DRX is often configured for all UEs 18.

The conventional paging mechanism in 3GPP LTE and, in particular, the conventional mechanism for assigning the UEs 18 to PFs and POs within the POs does not guarantee that UEs 18 that are likely to be paged at or near the same time are not assigned POs that are in close proximity in time to one another. As such, particularly for massive MTC UEs 18 (i.e., MTC UEs that are of a type that is massively deployed in the RAN 12 such as, for example, sensors), the conventional mechanism for assigning UEs 18 to PFs and POs may result in many UEs 18 being paged within the same radio frame or subframe, which in turn may lead to a large number of paging messages transmitted to the UEs 18 and a large number of responses from those UEs 18 (i.e., a paging flood).

Figure 2:
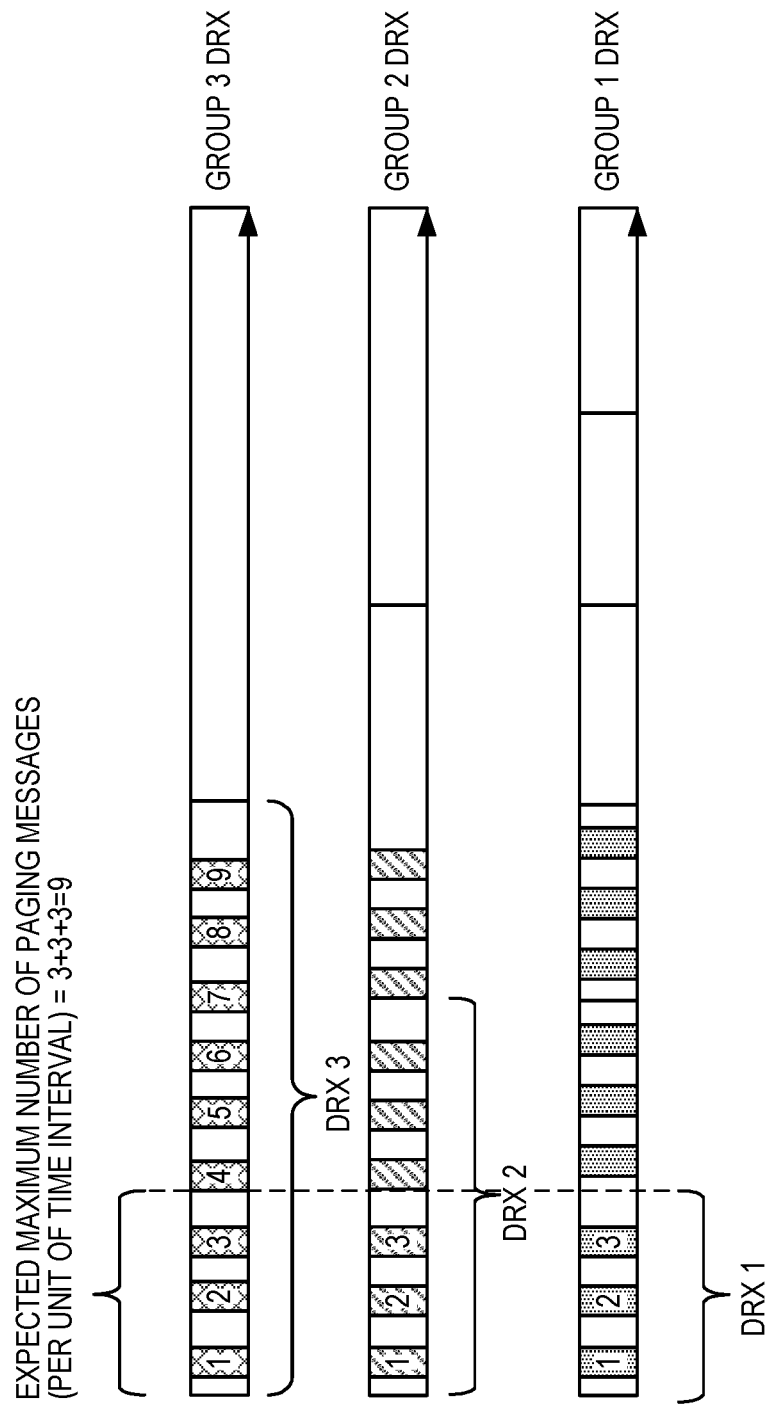
FIG. 2 graphically illustrates an expected maximum number of pages over a defined time interval when Paging Occasions (POs) are assigned in a conventional manner.

This is illustrated in FIG. 2 where, in this example, there are three groups of UEs 18 each having a respective DRX configuration. Group 1 includes three POs (numbered 1, 2, and 3) within its DRX ON duration DRX 1, Group 2 also has three POs (numbered 1, 2, and 3) within its DRX ON duration DRX 2, and Group 3 has nine POs (numbered 1 to 9) within its DRX ON duration. Over a defined period of time $[T_i, \ldots, T_{i+1}]$ of duration n×DRX 1 (where n=1 in the example of FIG. 2), when using the conventional mechanisms, nine paging messages are expected during the period of time $[T_i, \ldots, T_{i+1}]$. Systems and methods are disclosed herein for reducing (e.g., minimizing) the probability that paging messages will be transmitted by the base stations 14 for all POs within the defined period of time $[T_i, \ldots, T_{i+1}]$. In other words, embodiments of the present disclosure reduce (e.g., minimize) the number of simultaneous IDLE to CONNECTED transitions during the defined period of time $[T_i, \ldots, T_{i+1}]$.

Two approaches are presented herein: static and dynamic scheduling. The static approach predetermines the POs for a specific group of devices within a PF. The dynamic approach tackles the problem by balancing the average of POs by a heuristic that looks up M frames ahead of time and schedules the POs based on the grouping and the allowed quota per group per time interval. The dynamic approach can also reduce the signaling load as compared to the group paging backoff timer approach.

The two approaches can be combined when performing a dynamic approach for devices with extremely low frequency of paging events.

In the following discussion two schemes are described for scheduling POs; namely, a static scheme and a dynamic scheme. In the static scheme, the POs are predetermined for a specific group of UEs 18 within a PF. In contrast, the dynamic scheme dynamically schedules the POs based on factors such as, for example, an allowed quota of POs per group per time interval. The dynamic approach can also reduce signaling load as compared to the group paging backoff timer approach, which is described in ZTE, "R2-111916: Backoff enhancements for RAN overload control," 3GPP TSG RAN WG2 #73bis, Apr. 11-15, 2011. Further, the static and dynamic approaches can be combined by, e.g., performing a dynamic approach for UEs 18 with extremely low frequency of paging event. In other words, the static and dynamic approaches can be combined by, e.g., scheduling some UEs that are frequent and not moving using the static approach and by scheduling low priority UEs using the dynamic approach.

Figure 3:
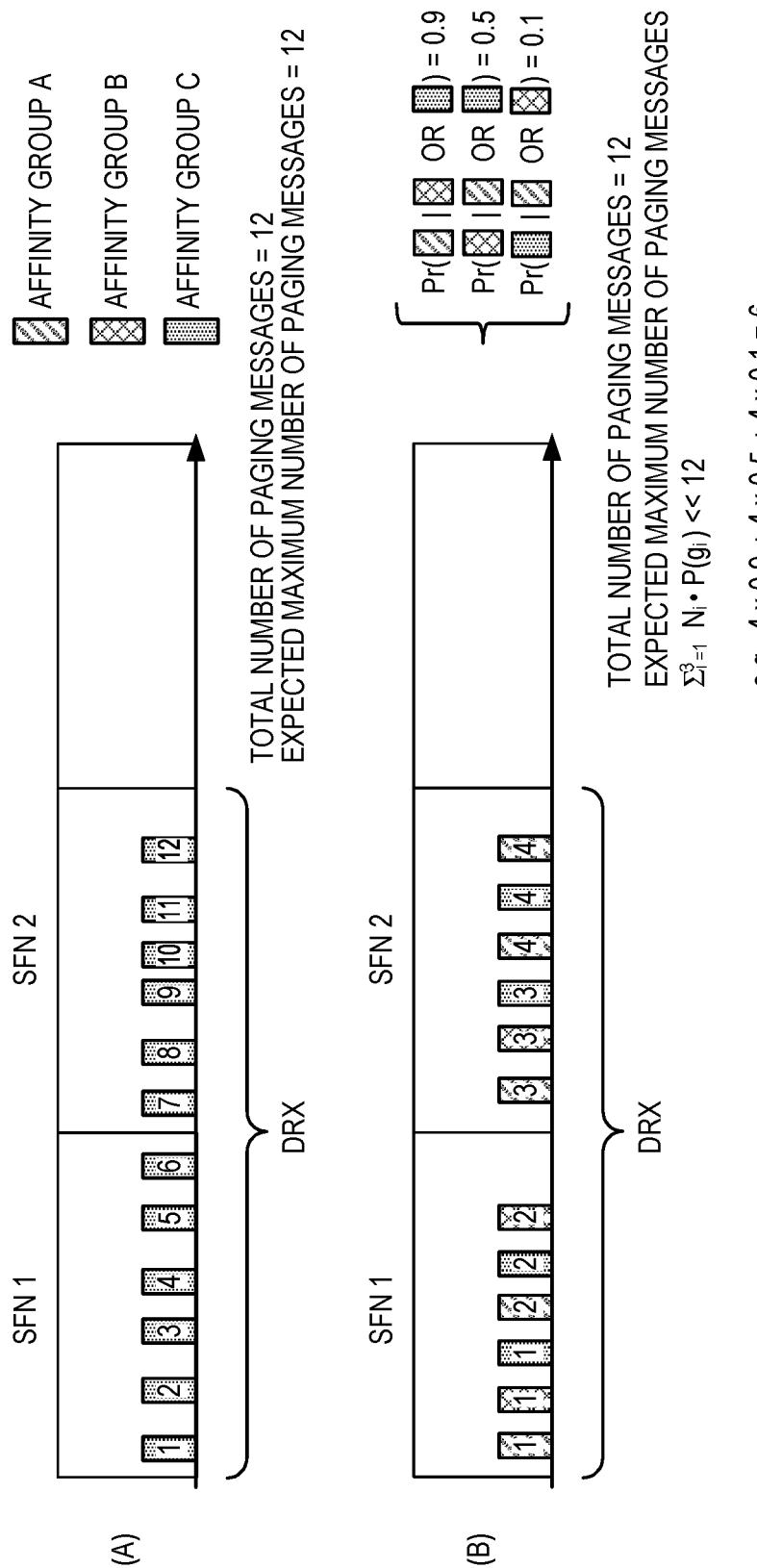
FIG. 3 is a graphic illustration of static scheduling of POs based on anti-affinity groups according to some embodiments of the present disclosure.

FIG. 3 is a graphic illustration of static scheduling of POs according to some embodiments of the present disclosure. FIG. 3(a) illustrates that within a defined time period equal to 1×DRX in this example, there are twelve predefined POs. In particular, the DRX ON duration spans two radio frames (SFN 1 and SFN 2), where each of the two radio frames includes six POs. Thus, the expected maximum number of paging messages during this defined time period when using conventional 3GPP LTE mechanisms is twelve.

FIG. 3(b) illustrates an example of static scheduling of POs according to some embodiments of the present disclosure. The UEs 18 are assigned to multiple affinity groups. As used herein, an "affinity group" is a group of UEs that have similar characteristics. Affinity groups may be based on one or more criteria including one or more of the following: traffic arrival distribution function (uniform, exponential, periodic) and parameters (mean rate, connection duration, etc.), network characteristics and capabilities, device types and features, type of MTC application, critical MTC or non-critical MTC, and/or device mobility characteristics (static or mobile). In this example, there are three affinity groups, referred to as affinity groups A, B, and C. In this example, the UEs 18 in the three affinity groups share a common DRX configuration. Further, each affinity group is statically assigned to, or mapped to, in this example, four of the POs. In other words, each affinity group is assigned to a different subset of POs over the defined period of time. Each UE 18 is assigned to only one affinity group. In this particular example, a first UE 18 from affinity group A is assigned to the first PO in SFN 1, a first UE 18 from affinity group B is assigned to the second PO in SFN 1, a first UE 18 from affinity group C is assigned to the third PO in SFN 1, a second UE 18 in affinity group A is assigned to the fourth PO in SFN 1, and so on.

Importantly, the three affinity groups are "anti-affinity groups." As used herein, an "anti-affinity group" is a group of two or more affinity groups that have a low likelihood of being paged within the same interval of time. In other words, the anti-affinity group is such that, over a defined period of time equal to n×DRX (where n=1 in the example of FIG. 3):

$$\sum_{i=1}^{N} N_i P(g_i \mid g_{N \setminus i}) < A \sum_{i=1}^{N} N_i$$

where N is a number of affinity groups in the anti-affinity group, $N_i$ is a number of POs assigned to the i-th affinity group within the defined time interval, $P(g_i|g_{N \setminus i})$ is a probability of a paging message in the defined time interval for the i-th affinity group ($g_i$) given that a paging message for any of the other N affinity groups also occurs in the defined time interval, and A is an anti-affinity threshold. The anti-affinity threshold A is less than 1. In some embodiments, the anti-affinity threshold A is less or equal to 0.75. In some other embodiments, the anti-affinity threshold is less than or equal to 0.5. In the particular example of FIG. 3, N=3, $N_i$=4 for all values of i, and A=1 such that the expected maximum number of paging messages over the defined period of time is equal to:

$$\sum_{i=1}^{3} 4 \times P(g_i \mid g_{N \setminus i}) < 12$$

Anti-affinity groups and the probabilities $P(g_i|g_{N \setminus i})$ may be determined or otherwise obtained in any suitable manner. For example, anti-affinity groups and probabilities $P(g_i|g_{N \setminus i})$ may be determined based on, e.g., previous history and/or prediction methods. Comparing FIG. 3(*a*) and FIG. 3(*b*), although the same capacity is allocated for paging (i.e., the same number of POs are allocated for paging), the expected maximum number of paging messages actually transmitted is substantially reduced.

In some embodiments, the POs are scheduled in a similar way as done in 3GPP TS 36.304 except for the assignment of PO indices to the UEs 18. More specifically, within a PF, the POs have corresponding indices such that, for example, the first PO in the PF has a PO index of 0, the second PO in the PF has a PO index of 1, and so on. For example, for Frequency Division Duplexing (FDD) and Ns=4, the POs in the PF will be subframes 0, 4, 5, and 9 according to the definition in 3GPP TS 36.304, Section 7.2. Subframe 0 has PO index i_s=0, subframe 4 has PO index i_s=1, subframe 5 has PO index i_s=2, and subframe 9 has PO index i_s=3. For a particular UE 18, the UE 18 may compute its PF as:

PF=SFN mod *T*=(*T* div *N*)×(UE_ID mod *N*)

where SFN is the system frame number, T is the DRX Cycle of the UE 18, N is the number of PFs within the UE's DRX cycle, and UE_ID is the UE_id derived from modulo operations on the IMSI of the UE 18. However, rather than computing its PO index based on its IMSI as conventionally done in 3GPP LTE, the UE 18 is assigned a PO index based on its affinity group. More specifically, one or more of the POs (having corresponding PO indices) in the PF are statically allocated to the affinity group of the UE 18, and the UE 18 is configured with the PO index of one of those POs.

Figure 4:
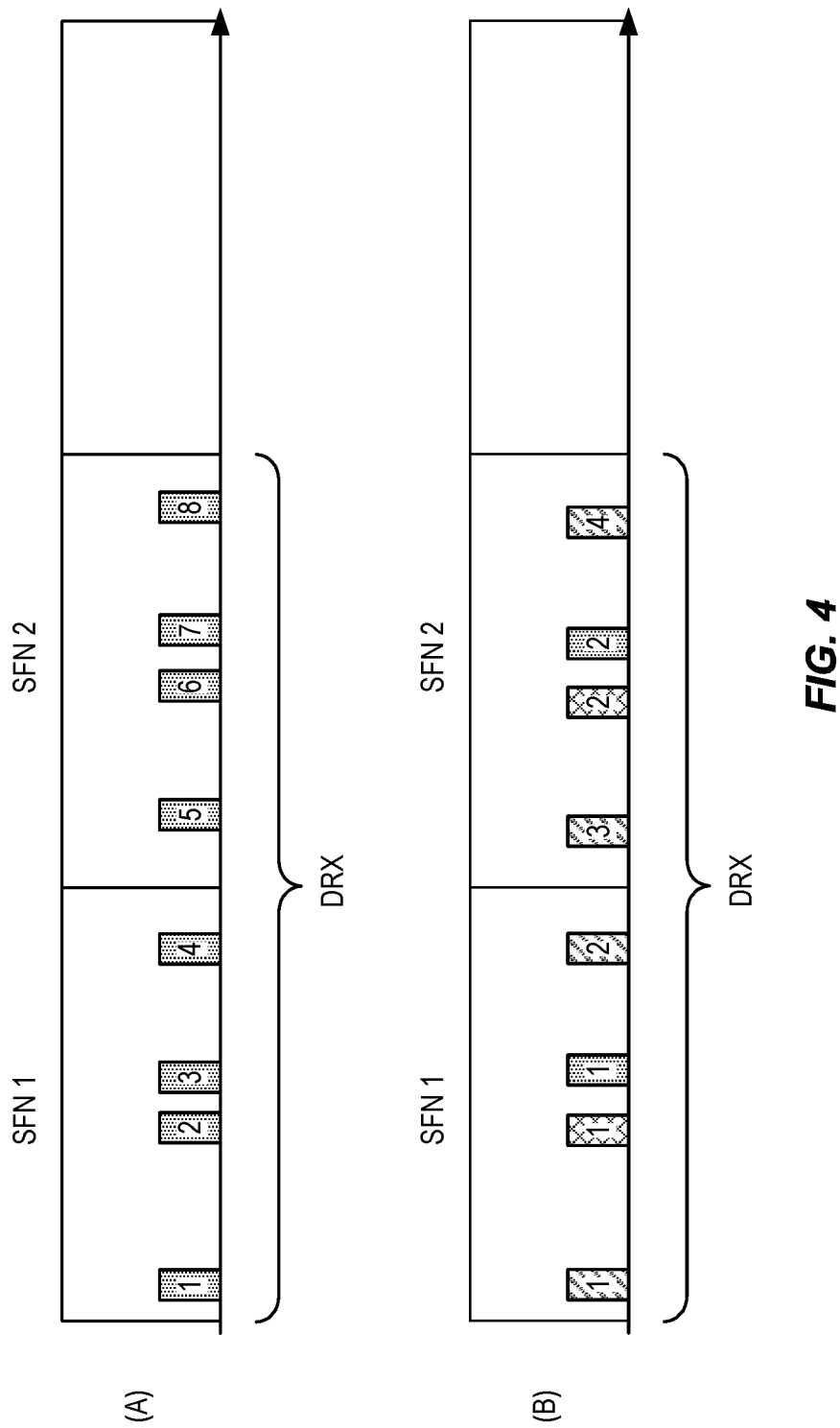
FIG. 4 illustrates an example mapping of affinity groups to PO indices such that, over a defined time period, PO indices are assigned to two or more anti-affinity groups.

FIG. 4 illustrates an example mapping of affinity groups to PO indices such that, over a defined time period, PO indices are assigned to two or more anti-affinity groups. Notably, the mapping of affinity groups to PO indices may be static or may be updated (e.g., periodically). Similarly, anti-affinity groups may be static or may be updated (e.g., periodically) based on, e.g., history and/or predictions.

In particular, FIG. 4(*a*) illustrates that within a defined time period equal to 1×DRX in this example, there are eight predefined POs. In particular, the DRX ON duration spans two radio frames (SFN 1 and SFN 2), where each of the two radio frames includes four POs. Thus, the expected maximum number of paging messages during this defined time period when using conventional 3GPP LTE mechanisms is eight.

FIG. 4(*b*) illustrates an example of static scheduling of POs according to some embodiments of the present disclosure. The UEs 18 share a common DRX cycle and are assigned to three affinity groups, referred to as affinity groups A, B, and C. In this example, affinity group A is statically assigned, or mapped, to four of the POs, affinity group B is statically assigned to two POs, and affinity group C is statically assigned to two POs. Each UE 18 is assigned to only one affinity group. In this particular example, a first UE 18 from affinity group A is assigned to the first PO in SFN 1 (i.e., configured with a first PO index in SFN 1), a first UE 18 from affinity group B is assigned to the second PO in SFN 1 (i.e., configured with a second PO index in SFN 1), a first UE 18 from affinity group C is assigned to the third PO in SFN 1 (i.e., configured with a third PO index in SFN 1), a second UE 18 in affinity group A is assigned to the fourth PO in SFN 1 (i.e., configured with a fourth PO index in SFN 1), a third UE 18 in affinity group A is assigned to the first PO in SFN 2 (i.e., assigned a first PO index in SFN 2), and so on. The three affinity groups are anti-affinity groups such that the expected maximum number of paging messages over the defined time period is substantially reduced.

Figure 5:
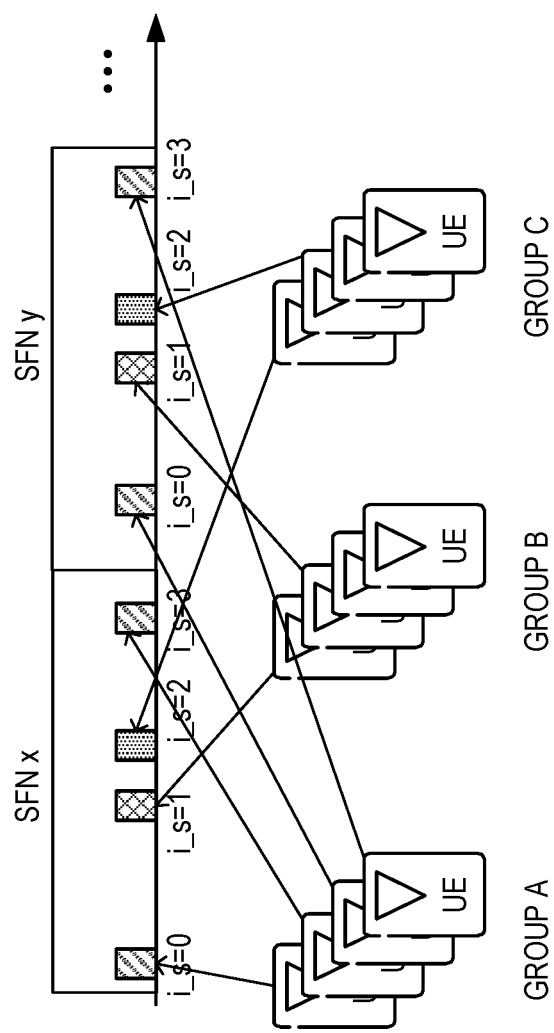
FIG. 5 illustrates the assignment of User Equipment devices (UEs) to the POs (and more specifically PO indices) within two Paging Frames (PFs) according to some embodiments of the present disclosure.

FIG. 5 illustrates the assignment of UEs 18 to the POs (and more specifically PO indices) within two PFs, which are radio frames having SFN x and SFN y, according to some embodiments of the present disclosure. As illustrated, Group A is assigned to PO indices i_s=0 and i_s=3 in SFN x and PO indices i_s=0 and i_s=3 in SFN y. A first UE 18 in Group A whose PF is SFN x is configured with PO index i_s=0, a second UE 18 in Group A whose PF is SFN x is configured with PO index i_s=3, a third UE 18 in Group A whose PF is SFN y is configured with PO index i_s=0, and a fourth UE 18 in Group A whose PF is SFN y is configured with PO index i_s=3. Group B is assigned to PO index i_s=1 in SFN x and PO index i_s=1 in SFN y. A first UE 18 in Group B whose PF is SFN x is configured with PO index i_s=1, and a second UE 18 in Group B whose PF is SFN y is configured with PO index i_s=1. Group C is assigned to PO index i_s=2 in SFN x and PO index i_s=2 in SFN y. A first UE 18 in Group C whose PF is SFN x is configured with PO index i_s=2, and a second UE 18 in Group C whose PF is SFN y is configured with PO index i_s=2. Groups A, B, and C are anti-affinity groups such that, over the defined time period including SFN x and SFN y, the probability of transmitting paging messages to the UEs in Groups A, B, and C in all eight of the POs is substantially reduced.

Figure 6:
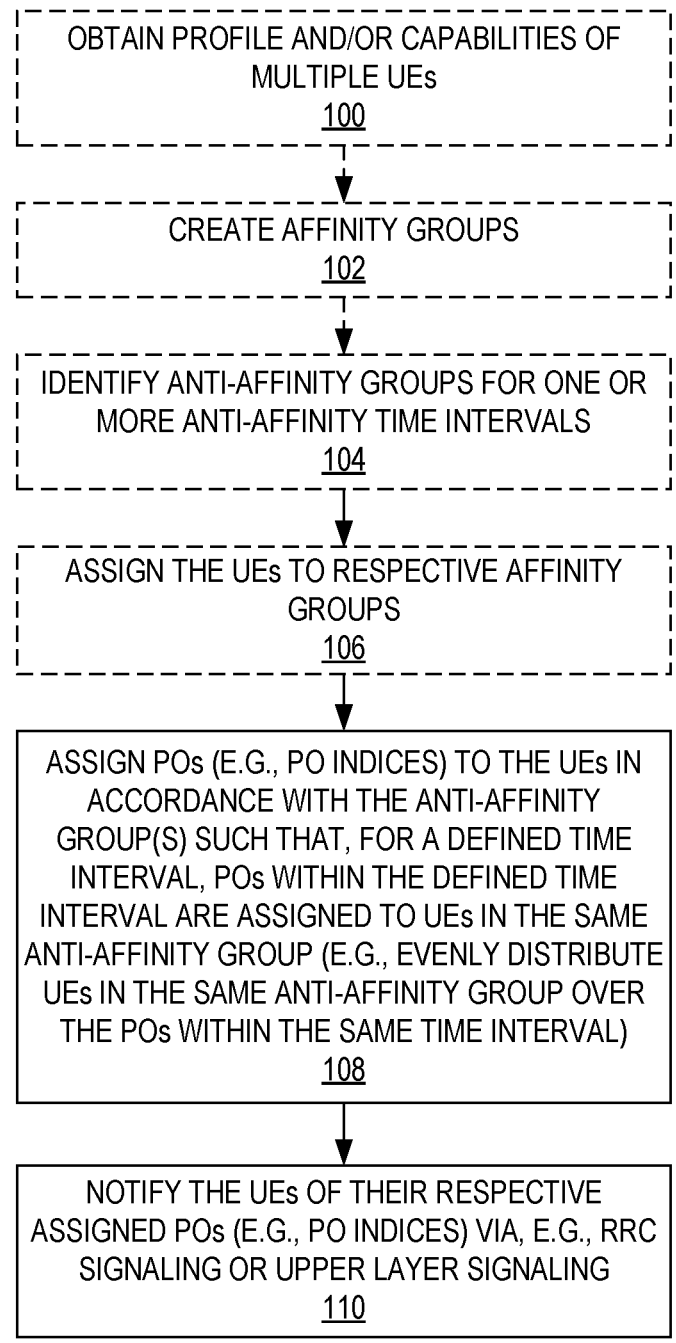
FIG. 6 is a flow chart that illustrates the operation of a network node to statically schedule POs according to some embodiments of the present disclosure.

FIG. 6 is a flow chart that illustrates the operation of a network node to statically schedule POs according to some embodiments of the present disclosure. Optional steps are indicated by dashed lines. Further, the steps may be performed in any desired order unless explicitly stated or otherwise required. As illustrated, the network node (e.g., a base station 14 or other network node) obtains profiles and/or capabilities of the UEs 18 (step 100). The network node may obtain this information from the UEs 18 and/or from another network node. The network node creates a number of affinity groups (step 102). One example of a technique for forming affinity groups is described below. In some embodiments, there is a predefined maximum number of affinity groups that can be created. This predefined maximum number may depend on various factors such as, for example, the total number of UEs 18, network capabilities, and requirements of UE applications (e.g., requirements of MTC applications). Alternatively, the affinity groups may be predefined. The network node identifies a number of anti-affinity groups (step 104). In general, an anti-affinity group is a group of two or more affinity groups that satisfies the criterion of $\Sigma_{i=1}^{N} N_i P(g_i | g_{N \setminus i}) < A \Sigma_{i=1}^{N} N_i$, as described above. Based on profiles and/or capabilities of the UEs 18, the network node assigns each of the UEs 18 to one of the affinity groups (step 106).

In this example, the PFs and the POs in the PFs are statically defined. The network node assigns POs (e.g., PO indices) to the UEs 18 in accordance with the anti-affinity group(s) such that, for a defined time interval, POs within the defined time interval are assigned to UEs in the same anti-affinity group (step 108). For example, if there are N affinity groups in the anti-affinity group, the network node assigns PO indices to the UEs 18 such that, over the defined time interval, POs within the defined time interval are assigned to the UEs 18 in the N affinity groups that are in the anti-affinity group. For example, the PO indices may be assigned such that the POs in the defined time interval are evenly distributed among the UEs in the N affinity groups (e.g., as in the example of FIG. 3). However, the PO indices may be assigned such that the POs in the defined time interval are not evenly distributed among the UEs in the N affinity groups (e.g., as in the example of FIG. 4).

The network node notifies the UEs 18 of their respective assigned POs (step 110). In particular, the network node notifies the UEs 18, or configures the UEs 18, with their respective assigned PO indices. This notification or configuration may be sent using any suitable mechanism such as, for example, Radio Resource Control (RRC) signaling or upper layer signaling. For example, if a UE 18 is in RRC_CONNECTED state, the UE 18 can be notified of its assigned PO index via a modified Non-Access Stratum (NAS) messaging scheme. As another example, if a UE 18 is in RRC_IDLE state, the UE 18 can be notified of its assigned PO index via a UE specific DRX configuration made by upper layers (e.g., configured via NAS Attach accept and Tracking Area Update (TAU) accept messages). An alternative approach is to use unused fields in the paging message (within paging record Information Element (IE)) for communicating DRX parameters including the PO index.

Figure 7:
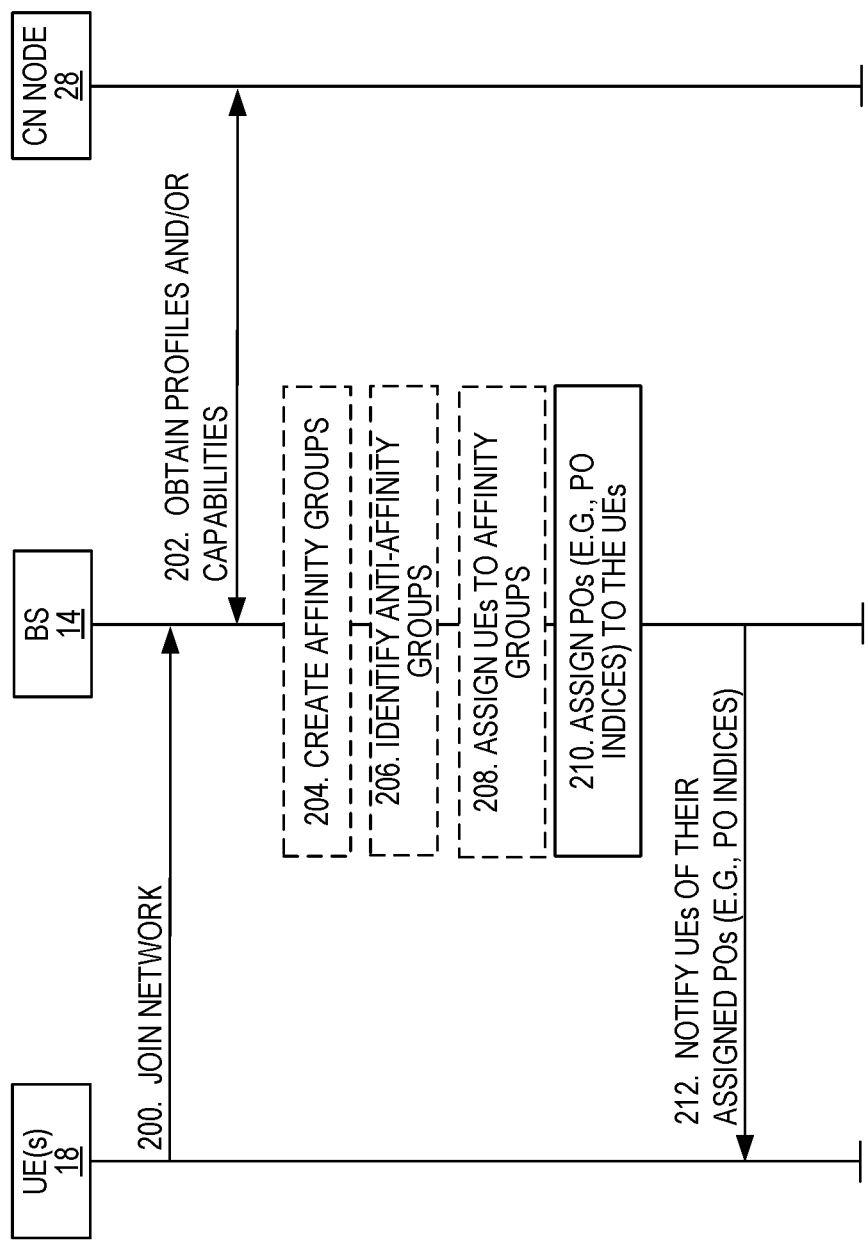
FIG. 7 illustrates the operation of a base station, a UE(s), and a core network node according to some embodiments of the present disclosure in which POs are statically scheduled.

FIG. 7 illustrates the operation of a base station 14, the UE(s) 18, and a core network (CN) node 28 according to some embodiments of the present disclosure. The procedure here is similar to that of FIG. 6 in that, in this example, the base station 14 performs the process of FIG. 6. Again, optional steps are indicated by dashed lines. Further, the steps may be performed in any desired order unless explicitly stated or otherwise required. As illustrated, the UE(s) 18 join the network (step 200). The base station 14 obtains profiles and/or capabilities of the UE(s) 18 from, in this example, the core network node 28 (step 202). The base station 14 creates a number of affinity groups (step 204). Alternatively, the affinity groups may be predefined. The base station 14 identifies a number of anti-affinity groups (step 206). In general, an anti-affinity group is a group of two or more affinity groups that satisfies the criterion of $\Sigma_{i=1}^{N} N_i P(g_i | g_{N \setminus i}) < A \Sigma_{i=1}^{N} N_i$, as described above. Based on profiles and/or capabilities of the UE(s) 18, the base station 14 assigns each of the UEs 18 to one of the affinity groups (step 208).

In this example, the PFs and the POs in the PFs are statically defined. The base station 14 assigns POs (e.g., PO indices) to the UEs 18 in accordance with the anti-affinity group(s) such that, for a defined time interval, POs within the defined time interval are assigned to UEs 18 in the same anti-affinity group, as described above (step 210). The base station 14 notifies the UE(s) 18 of its (their) respective assigned PO(s) (step 212). In particular, the base station 14 notifies the UE(s) 18, or configures the UE(s) 18, with its (their) respective assigned PO index (indices). This notification or configuration may be sent using any suitable mechanism such as, for example, RRC signaling or upper layer signaling.

Figure 8:
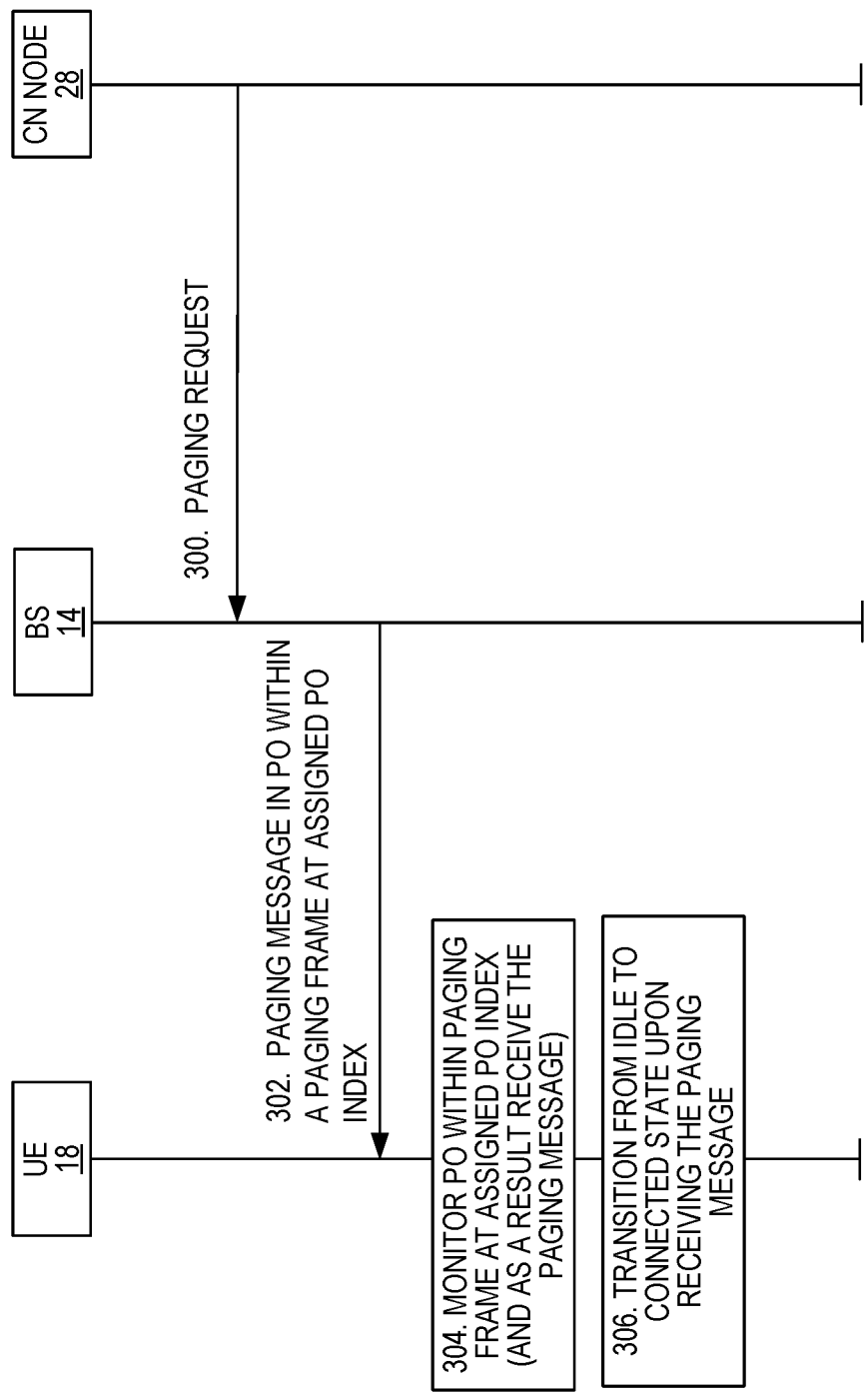
FIG. 8 illustrates one example of a paging procedure according to some embodiments of the present disclosure.

FIG. 8 illustrates one example of a paging procedure according to some embodiments of the present disclosure. As illustrated, a core network node 28 sends a paging request to the base station 14 (step 300). Note that this core network node 28 may or may not be the same core network node 28 from which the profiles and/or capabilities of the UEs 18 were obtained in step 202 of FIG. 7. The paging request sent by the core network node 28 may be initiated by, e.g., an MTC application server. Upon receiving the paging request, the base station 14 sends a paging message to the respective UE 18 in a PO within the PF of the UE 18 at the configured PO index of the UE 18 (step 302). At the UE 18, the UE 18 wakes up from DRX to monitor the PO at the configured PO index of the UE 18 within the PF of the UE 18 (step 304). Upon detecting the paging message, the UE 18 transitions from IDLE state to CONNECTED state (step 306).

As discussed above, the anti-affinity groups may be formed using any suitable mechanism. While any suitable mechanism can be used, one example will now be described. A profile in the context of an affinity group can be represented by an Affinity Group Profile (AGP) that can be described by a set of n attributes as following:

$$AGP_c = (a_1^c, a_2^c, \ldots, a_n^c)$$

where $a_n^c$ is the $n^{th}$ attribute of $AGP_c$. Examples of attributes can be traffic arrival distribution function (uniform, exponential, periodic) and parameters (mean rate, connection duration, etc.), network characteristics and capabilities, device types and features, type of MTC application, critical MTC or non-critical MTC, device mobility characteristics (static or mobile), etc. Anti-affinity groups contain a set of profiles classified under certain constraints that mimic a maximum measure of distinction among elements classified in k disjoint sets with added constraint on the traffic arrival distribution functions to be uncorrelated such that the correlation coefficient $-1 \leq \rho \leq 0$.

Figure 9:
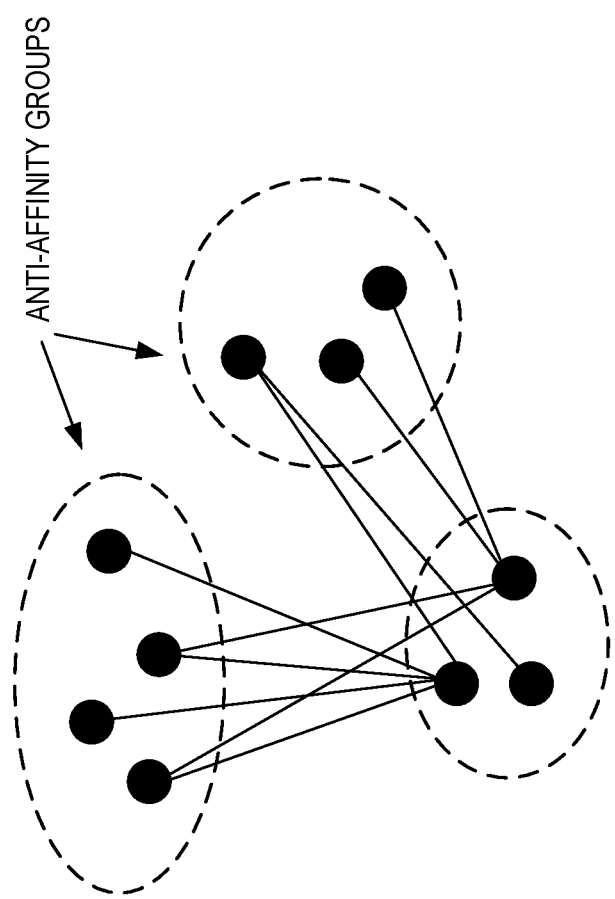
FIG. 9 graphically illustrates one example of the formation of affinity groups and anti-affinity groups according to some embodiments of the present disclosure.

The problem of identifying an anti-affinity group can be posed with a k-partite graph of k disjoint sets of vertices representing the profiles and edges that represent the relationship among the profiles, as illustrated in FIG. 9. Given a number of DRX cycles (which is constrained by the nature of the application) POs can be scheduled on each set such that POs spanning the same cycle are not placed on two adjacent sets.

Based on a set of n attributes, a smaller set of attributes k<n is derived by means of dimension reduction techniques such as Principle Component Analysis (PCA) and form a k-space axis of decision (assume orthonormal). Once the orthonormal dimensions of the decision are formed, the anti-affinity groups can be formed by selecting the sets of profiles that contain elements with maximized pairwise Euclidean distance.

The above mentioned PCA reduction can be performed by forming the matrix of eigenvectors. Let this be a matrix $E_{n \times n}$ whose columns are viewed as eigenvectors $\{e_1, e_2, \ldots e_n\}$ of the attribute matrix $M_{n \times n}$ in the order of largest eigenvalue first (i.e., $\lambda_1 > \lambda_2 > \ldots > \lambda_n$). In order to transform M dimensions to a space with a lower dimension, it is sufficient to choose the eigenvectors associated with the k largest eigenvalues in order to preserve the most significant elements. Therefore, let $E_k$ be the first k columns of eigenvalue sorted columns of matrix E. Then $ME_k$ is a k-dimensional representation of matrix M.

Figure 10:
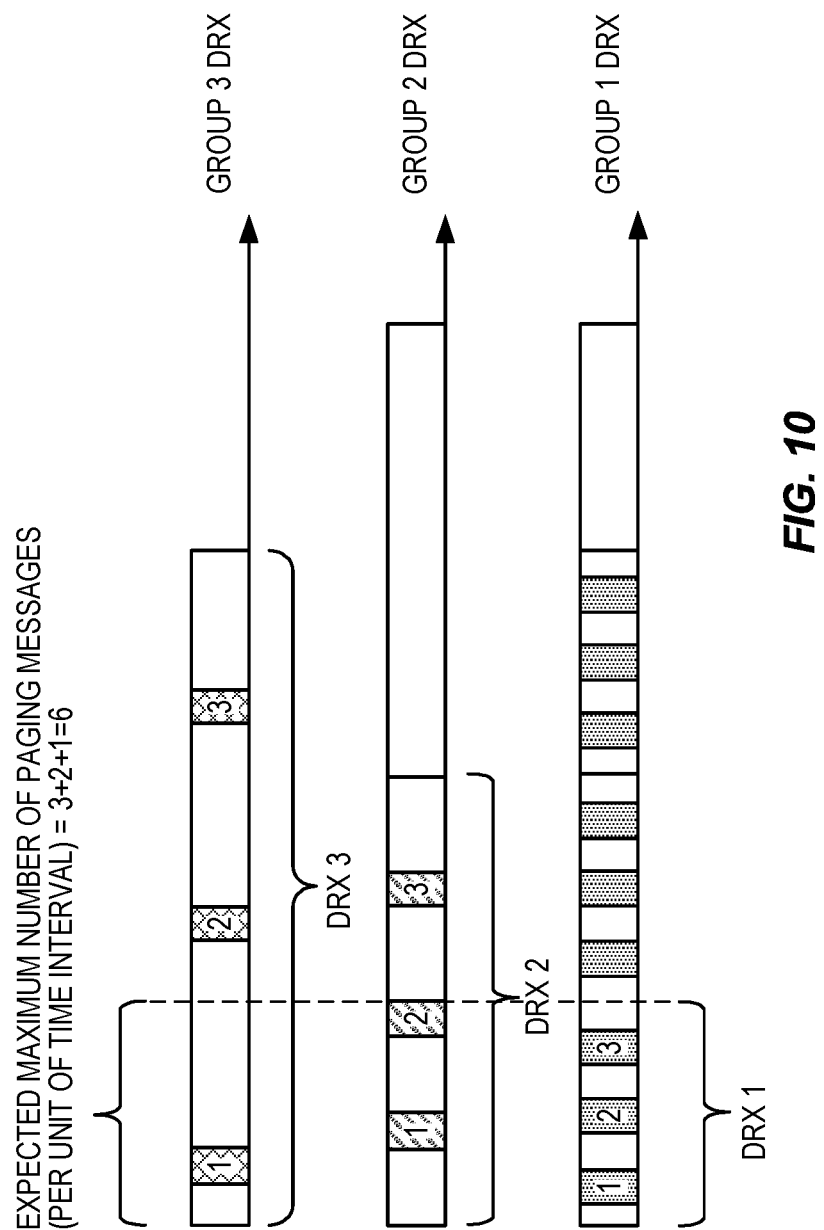
FIG. 10 graphically illustrates dynamic PO scheduling according to some embodiments of the present disclosure.

The discussion thus far has focused on static PO scheduling. The discussion will now turn to embodiments of the present disclosure related to dynamic PO scheduling and paging load distribution. For the case of the dynamic approach, in some embodiments, an approach to mimic the above mentioned proposal is to classify the UEs 18 on the basis of differentiating their DRX. In this manner, UEs 18 of a certain type will have the same DRX cycle, and the maximum number of UEs 18 of a certain type that can be paged within a certain time interval is limited by a quota. By doing so, the expected maximum number of UEs 18 that will be simultaneously paged within the defined time interval [$T_i$, $T_{i+1}$] will be reduced. One example of this is illustrated in FIG. 10. In the example of FIG. 10, there are three groups, each having a different DRX. For Group 1, the quota, or maximum number, of POs that can be dynamically scheduled within the time interval DRX 1 is 3. For Group 2, the quota, or maximum number, of POs that can be dynamically scheduled within the time interval DRX 1 is 2. For Group 3, the quota, or maximum number, of POs that can be dynamically scheduled within the time interval DRX 1 is 1. In this manner, the expected maximum number of pages within DRX 1 is 3+2+1=6.

The objective of the proposed paging load distribution embodiments is to minimize the expected maximum number of pages for an interval of [0, T) where T may cover n DRX periods. The proposed embodiments avoid scheduling UEs 18 that may be paged concurrently within a short time frame.

In some embodiments, anti-affinity groups are formed based on a certain number of profiles that are classified based on a larger set of attributes concerning the network, device, and type of traffic, broadly known as "context." The classification of affinity groups for the dynamic approach may take a different approach as the constraints and criteria for the problem vary from the static approach. For example, one of the main profiling attributes would be the frequency of paging arrivals and how long such a group of devices may remain idle. In some embodiments, the affinity groups and, in some embodiments, anti-affinity groups are utilized together with, e.g., quotas for the dynamic approach.

In some embodiments, for the dynamic approach, UEs 18 are classified into affinity groups based on profiles and/or capabilities of the UEs 18. Each affinity group is assigned or mapped to a respective DRX. POs are dynamically scheduled for the UEs 18 based on a maximum number of POs allowed in defined time interval for the respective affinity groups. There will be one PO per UE 18 for a DRX cycle.

A profile in the context of an affinity group can be represented by an AGP that can be described by a set of n attributes as follows:

$$AGP_c = (a_1^c, a_2^c, \ldots, a_n^c)$$

where $a_n^c$ is the $n^{th}$ attribute of $AGP_c$. Thus, the mapping of affinity group to a respective DRX can be as follows:

$$(a_1^c, a_2^c, \ldots, a_n^c) \rightarrow (DRX, num_{po})$$

where $num_{po}$ is the number of POs to be allocated for a certain DRX per group Identifier (ID). A simplified mapping heuristic can be considered.

Figure 11:
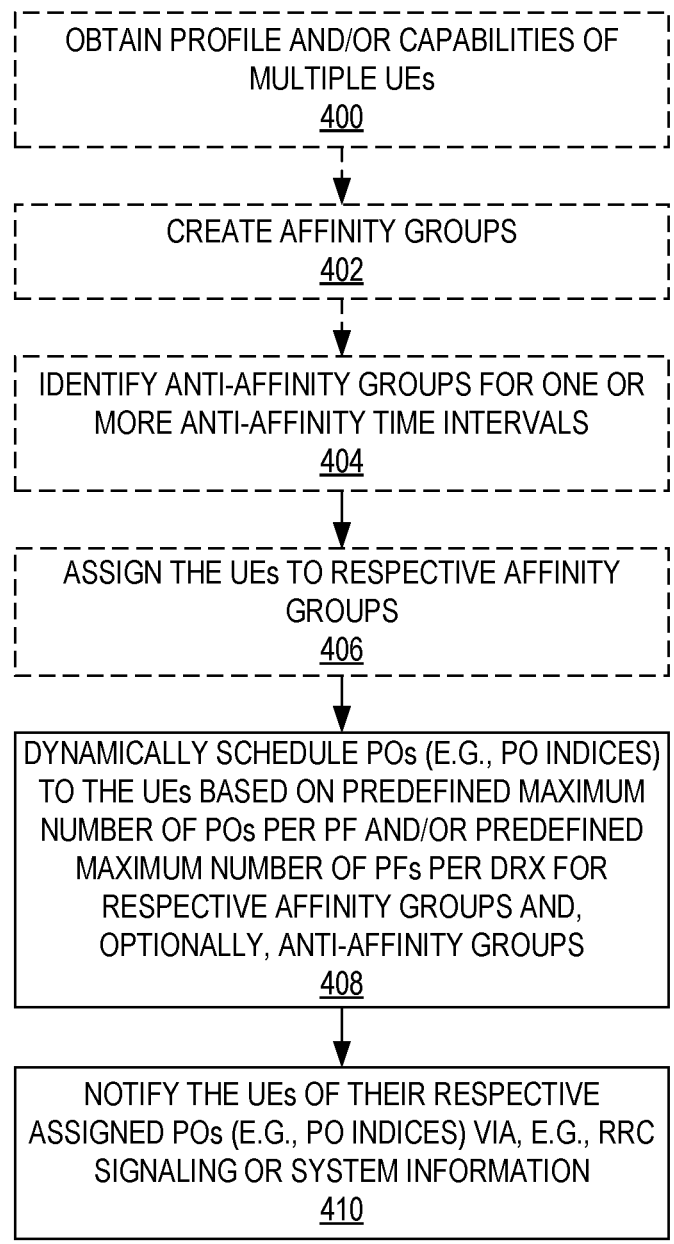
FIG. 11 is a flow chart that illustrates the operation of a network node (e.g., a base station or some other network node) to dynamically schedule POs according to some embodiments of the present disclosure.

FIG. 11 is a flow chart that illustrates the operation of a network node (e.g., a base station 14 or some other network node) to dynamically schedule POs according to some embodiments of the present disclosure. Optional steps are indicated by dashed lines. Further, the steps can be performed in any desired order unless explicitly stated or otherwise required. As illustrated, the network node (e.g., a base station 14 or other network node) obtains profiles and/or capabilities of the UEs 18 (step 400). The network node may obtain this information from the UEs 18 and/or from another network node. The network node creates a number of affinity groups (step 402). One example of a technique for forming affinity groups is described below. In some embodiments, there is a predefined maximum number of affinity groups that can be created. This predefined maximum number may depend on various factors such as, for example, the total number of UEs 18, network capabilities, and requirements of UE applications (e.g., requirements of MTC applications). Alternatively, the affinity groups may be predefined. The network node 18 identifies a number of anti-affinity groups (step 404). In general, an anti-affinity group is a group of two or more affinity groups that satisfies the criterion of $\Sigma_{i=1}^{N} N_i P(g_i | g_{N \setminus i}) < A \Sigma_{i=1}^{N} N_i$ as described above. Based on profiles and/or capabilities of the UEs 18, the network node assigns each of the UEs 18 to one of the affinity groups (step 406). In some embodiments, each affinity group corresponds to a different DRX cycle.

The network node dynamically schedules POs (i.e., configures PO indices) for the UEs 18 (step 408). In this embodiment, the network node dynamically schedules POs for the UEs 18 based on: (a) a predefined maximum number of POs per PF for the respective affinity group, where each maximum number of POs per PF may vary depending on the affinity group, and/or (b) a predefined maximum number of PFs per DRX cycle for the respective affinity group, where the maximum number of PFs for DRX cycle may vary depending on the affinity group. Still further, in some embodiments, the network node further takes anti-affinity groups into consideration when dynamically scheduling POs. For example, within a defined time interval, the network node may schedule POs for UEs in the same anti-affinity group to further reduce the expected maximum number of pages during that time interval.

The network node notifies the UEs 18 of their respective assigned POs (step 410). In particular, the network node notifies the UEs 18, or configures the UEs 18, with their respective assigned PO indices. This notification or configuration may be sent using any suitable mechanism such as, for example, RRC signaling or upper layer signaling. For example, if a UE 18 is in RRC_CONNECTED state, the UE 18 can be notified of its assigned PO index via a modified NAS messaging scheme. As another example, if a UE 18 is in RRC_IDLE state, the UE 18 can be notified of its assigned PO index via a UE specific DRX configuration made by upper layers (e.g., configured via NAS attach accept and TAU accept messages). An alternative approach is to use unused fields in the paging message (within paging record IE) for communicating DRX parameters including the PO index.

Figure 12:
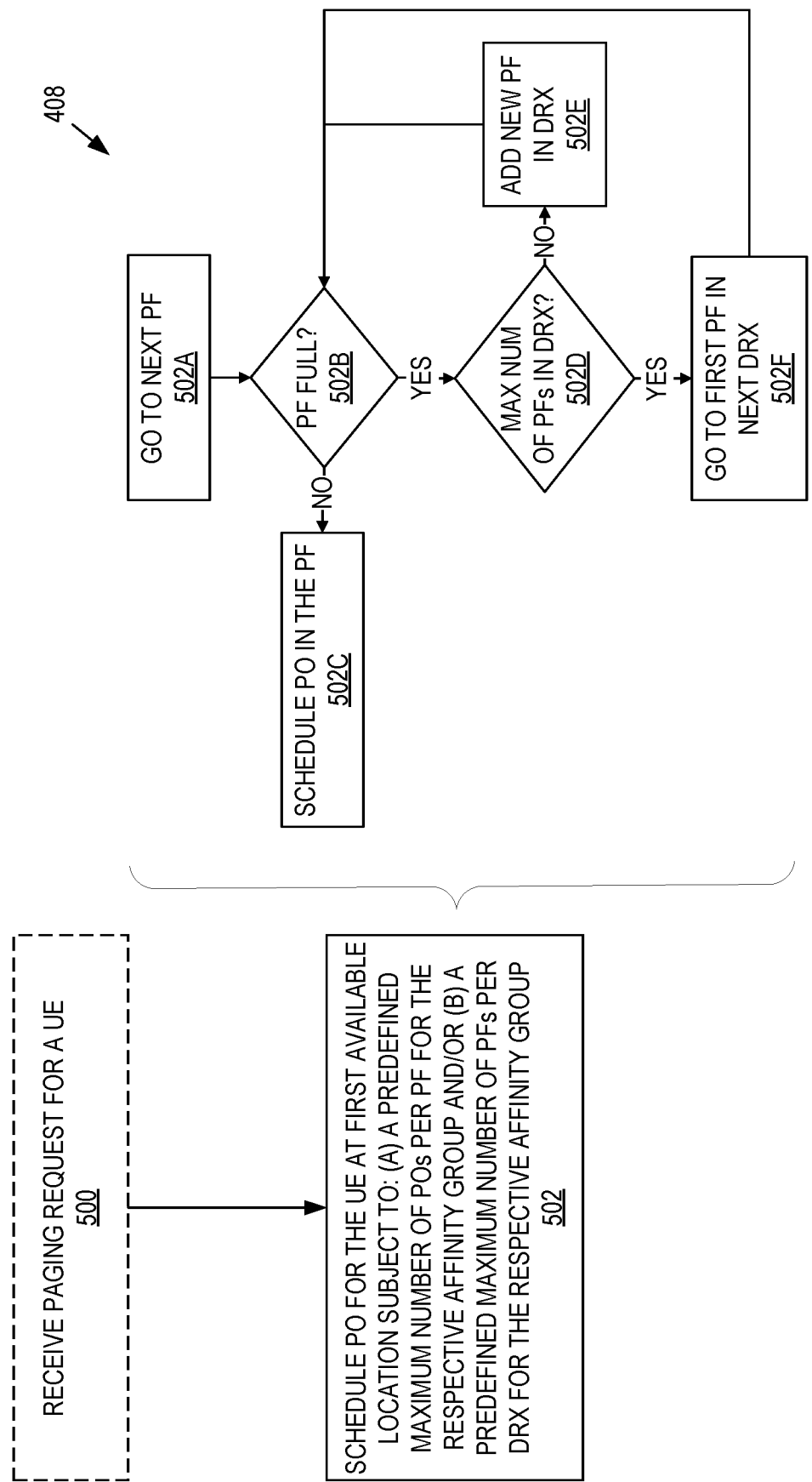
FIG. 12 is a flow chart that illustrates a process for dynamically scheduling a PO at a first available PO location according to some embodiments of the present disclosure.

FIG. 12 illustrates one example of step 408 of FIG. 11. In this example, the network node receives a paging request for a UE 18 (step 500). The network node schedules a PO for the UE 18 at a first available PO location subject to: (a) a predefined maximum number of POs per PF for the respective affinity group and/or (b) a predefined maximum number of PFs per DRX cycle for the respective affinity group (step 502). More specifically, in one particular example, the network node looks for the next available PO location by going to a next PF (step 502A) and determines whether the PF is full (i.e., determines whether the maximum number of POs for the affinity group have already been scheduled for that PF) (step 502B). If not, the network node schedules a PO for the UE 18 in that PF (step 502C). However, if the PF is full, the network node determines whether it has reached the predefined maximum number of PFs in the DRX cycle (step 502D). If not, the network node adds a new PF in the DRX cycle (step 502E) and returns to step 502B. If the maximum number of PFs in the DRX cycle has been reached, the network node goes to a first PF in the next DRX cycle (step 502F), and the process returns to step 502B.

Figure 13:
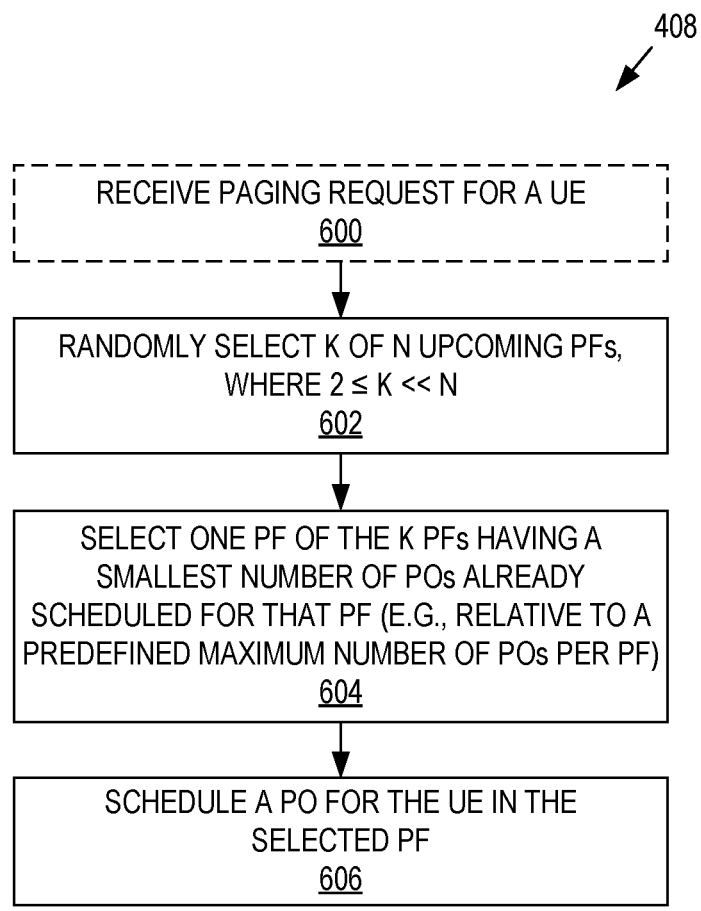
FIG. 13 is a flow chart that illustrates a process for dynamically scheduling a PO in such a manner as to provide PO distribution over a number of upcoming PFs according to some embodiments of the present disclosure.

FIG. 13 illustrates another example of step 408 of FIG. 11. In this example, the network node receives a paging request for a UE 18 (step 600). The network node randomly selects a number (K) of a number (N) of upcoming PFs, where 2≤K<<N (step 602). The network node selects one of the K PFs having a smallest number of POs already scheduled in that PF (e.g., relative to a predefined maximum number of POs per PF for the respective affinity group of the UE 18) (step 604). The network node schedules a PO for the UE 18 in the selected PF (step 606).

Figure 14:
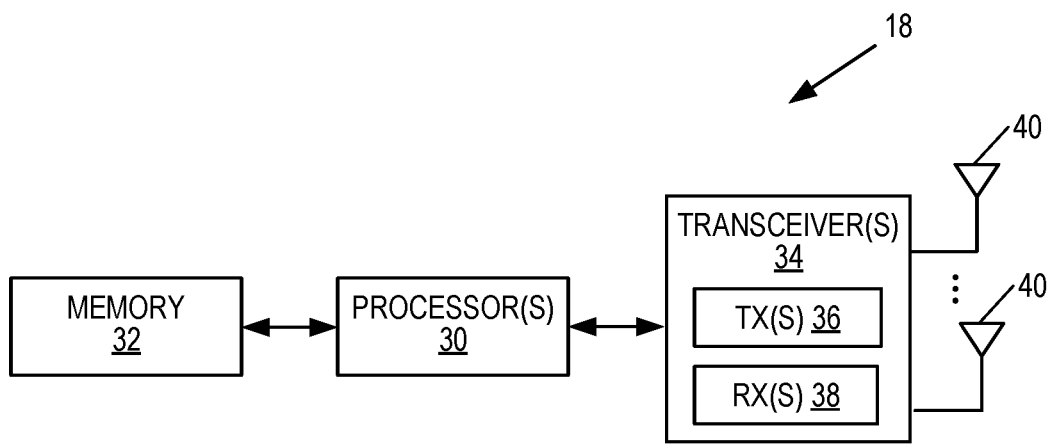
FIGS. 14 and 15 are block diagrams of example embodiments of a UE.

FIG. 14 is a schematic block diagram of a UE 18 according to some embodiments of the present disclosure. As illustrated, the UE 18 includes one or more processors 30 (e.g., Central Processing Units (CPUs), Application Specific Integrated Circuits (ASICs), Field Programmable Gate Arrays (FPGAs), and/or the like), memory 32, and one or more transceivers 34 each including one or more transmitters 36 and one or more receivers 38 coupled to one or more antennas 40. In some embodiments, the functionality of the UE 18 described above may be fully or partially implemented in software that is, e.g., stored in the memory 32 and executed by the processor(s) 30.

In some embodiments, a computer program including instructions which, when executed by at least one processor, causes the at least one processor to carry out the functionality of the UE 18 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
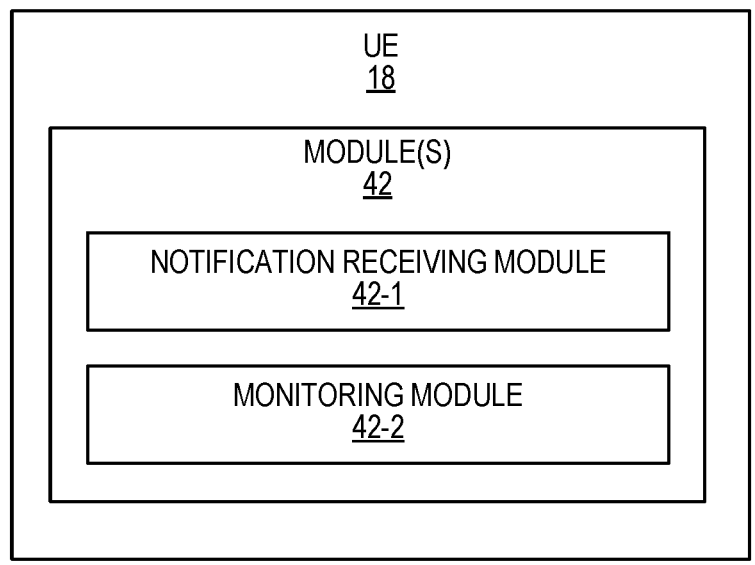

FIG. 15 is a schematic block diagram of the UE 18 according to some other embodiments of the present disclosure. The UE 18 includes one or more modules 42, each of which is implemented in software. The module(s) 42 provide the functionality of the UE 18 described herein. For example, in some embodiments, the UE 18 includes a notification receiving module 42-1 operable to receive, from a network node, a notification of a PO index assigned to the UE 18, and a monitoring module 42-2 operable to monitor a PO corresponding to the PO index within a PF.

Figure 16:
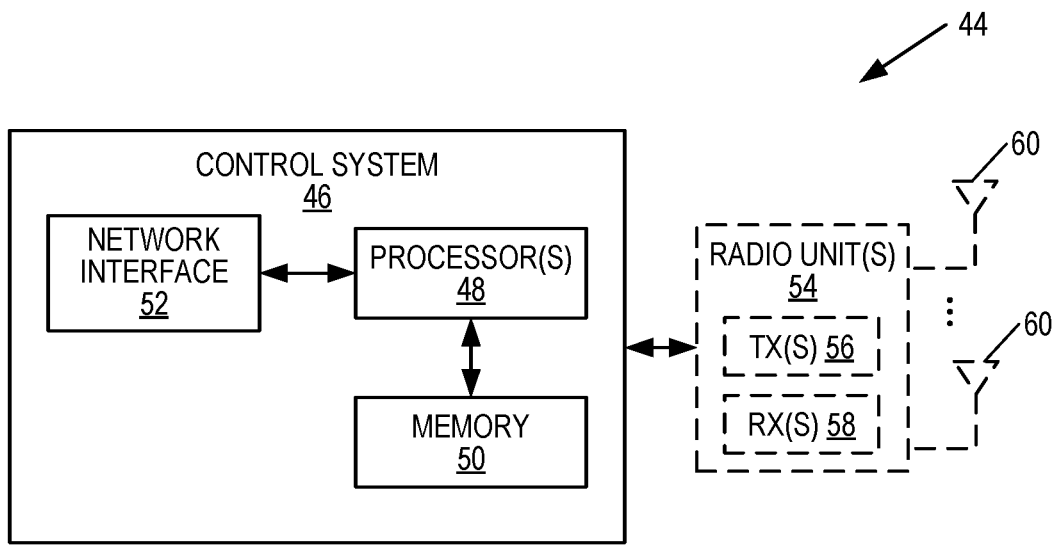
FIGS. 16 through 18 are block diagrams of example embodiments of a network node.

FIG. 16 is a schematic block diagram of a network node 44 according to some embodiments of the present disclosure. The network node 44 may be any network node in the RAN 12 or any network node in the core network 20. For example, the network node 44 may be a base station 14. As illustrated, the network node 44 includes a control system 46 that includes one or more processors 48 (e.g., CPUs, ASICs, FPGAs, and/or the like), memory 50, and a network interface 52. In addition, if the network node 44 is a radio access node, the network node 44 includes one or more radio units 54 that each includes one or more transmitters 56 and one or more receivers 58 coupled to one or more antennas 60. In some embodiments, the radio unit(s) 54 is external to the control system 46 and connected to the control system 46 via, e.g., a wired connection (e.g., an optical cable). However, in some other embodiments, the radio unit(s) 54 and potentially the antenna(s) 60 are integrated together with the control system 46. The one or more processors 48 operate to provide one or more functions of the network node 44 as described herein. In some embodiments, the function(s) are implemented in software that is stored, e.g., in the memory 50 and executed by the one or more processors 48.

Figure 17:
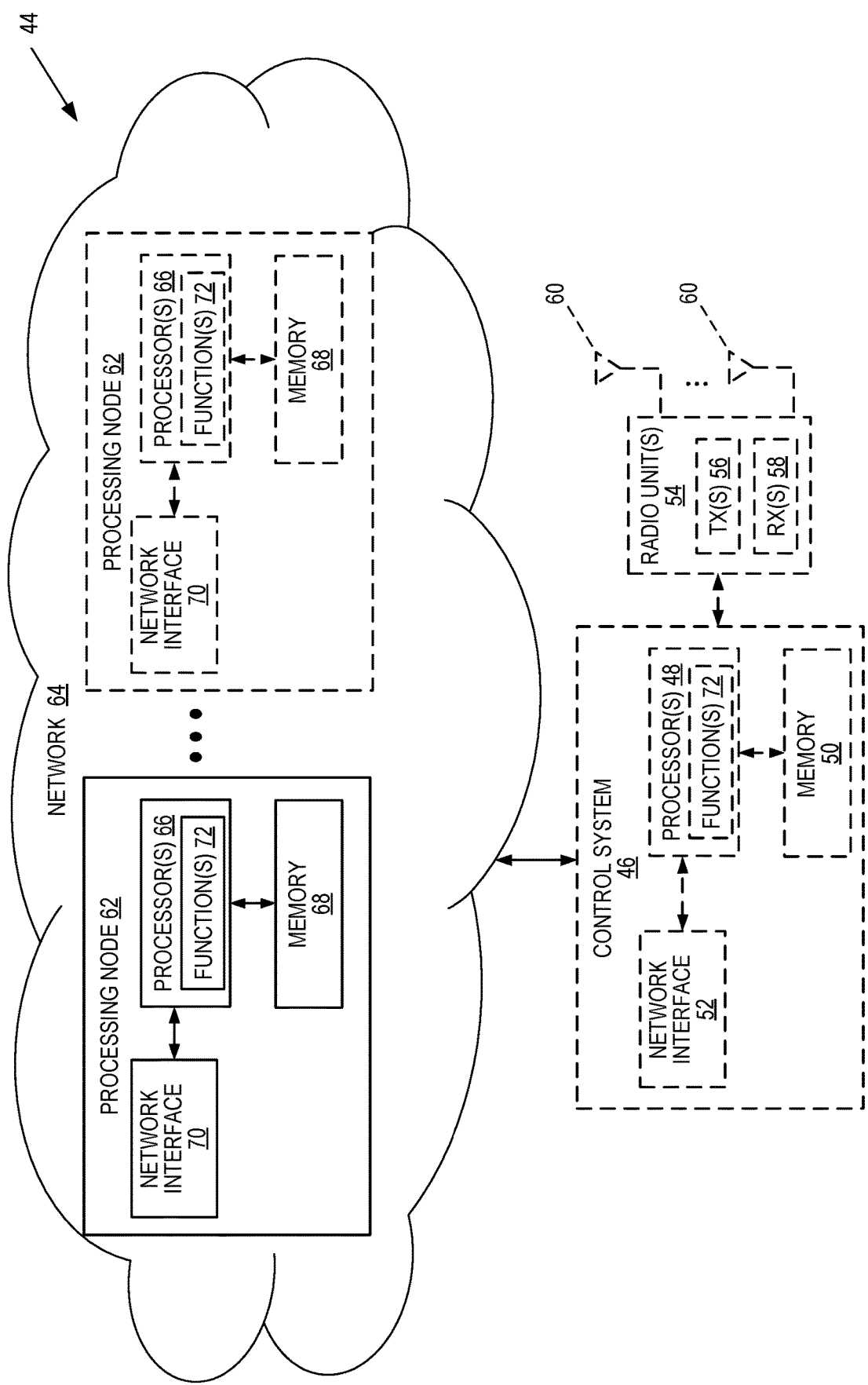

FIG. 17 is a schematic block diagram that illustrates a virtualized embodiment of the network node 44 according to some embodiments of the present disclosure. As used herein, a "virtualized" network node 44 is an implementation of the network node 44 in which at least a portion of the functionality of the network node 44 is implemented as a virtual component(s) (e.g., via a virtual machine(s) executing on a physical processing node(s) in a network(s)). As illustrated, in this example, the network node 44 includes the control system 46 that includes the one or more processors 48 (e.g., CPUs, ASICs, FPGAs, and/or the like), the memory 50, and the network interface 52 and, optionally, the one or more radio units 54 that each includes the one or more transmitters 56 and the one or more receivers 58 coupled to the one or more antennas 60, as described above. The control system 46 is connected to the radio unit(s) 54 via, for example, an optical cable or the like. The control system 46 is connected to one or more processing nodes 62 coupled to or included as part of a network(s) 64 via the network interface 52. Each processing node 62 includes one or more processors 66 (e.g., CPUs, ASICs, FPGAs, and/or the like), memory 68, and a network interface 70.

In this example, functions 72 of the network node 44 described herein are implemented at the one or more processing nodes 62 or distributed across the control system 46 and the one or more processing nodes 62 in any desired manner. In some particular embodiments, some or all of the functions 72 of the network node 44 described herein are implemented as virtual components executed by one or more virtual machines implemented in a virtual environment(s) hosted by the processing node(s) 62. As will be appreciated by one of ordinary skill in the art, additional signaling or communication between the processing node(s) 62 and the control system 46 is used in order to carry out at least some of the desired functions 72. Notably, in some embodiments, the control system 46 may not be included, in which case the radio unit(s) 54 (if included) communicate directly with the processing node(s) 62 via an appropriate network interface(s). In other embodiments, the network node 44 does not include either the control system 46 or the radio unit(s) 54 such that the network node 44 is entirely virtualized.

In some embodiments, a computer program including instructions which, when executed by at least one processor, causes the at least one processor to carry out the functionality of the network node 44 or a node (e.g., a processing node 62) implementing one or more of the functions 72 of the network node 44 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
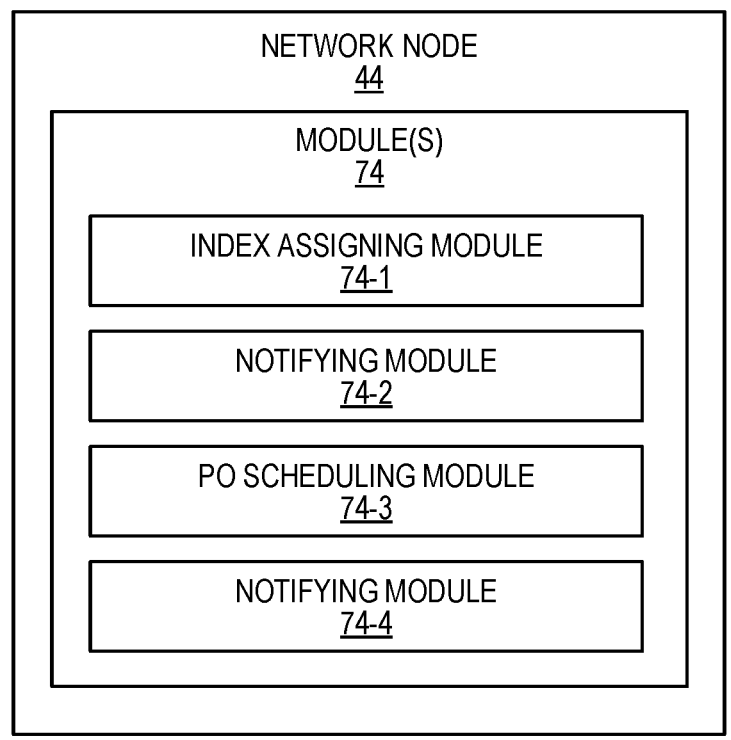

FIG. 18 is a schematic block diagram of the network node 44 according to some other embodiments of the present disclosure. The network node 44 includes one or more modules 74, each of which is implemented in software. The module(s) 74 provide the functionality of the network node 44 described herein. This discussion is equally applicable to the processing node 62 of FIG. 17 where the modules 74 may be implemented at one of the processing nodes 62 or distributed across multiple processing nodes 62 and/or distributed across the processing node(s) 62 and the control system 46. As an example, in some embodiments, the module(s) 74 may include an index assigning module 74-1 operable to assign POs to UEs 18 in accordance with one or more anti-affinity groups such that, for a defined time interval, POs in the defined time interval are assigned to UEs 18 within a same anti-affinity group, and a notifying module 74-2 operable to notify the UEs (18) of the PO indices assigned to the UEs 18. In some other embodiments, the module(s) 74 include a PO scheduling module 74-3 operable to dynamically schedule POs for UEs 18 based on a predefined maximum number of POs per PF and/or a predefined number of PFs per DRX awake period, and a notifying module 74-4 operable to notify the UEs 18 of the POs dynamically scheduled for the UEs 18.

The following acronyms are used throughout this disclosure.

μs Microsecond
3GPP Third Generation Partnership Project
5G Fifth Generation
AGP Affinity Group Profile
ASIC Application Specific Integrated Circuit
CN Core Network
CP Cyclic Prefix
CPU Central Processing Unit
DFT Discrete Fourier Transform
DRX Discontinuous Reception
eDRX Extended Discontinuous Reception
eNB Enhanced or Evolved Node B
FDD Frequency Division Duplexing
FDMA Frequency Division Multiple Access
FPGA Field Programmable Gate Array
ID Identifier
IE Information Element
IMSI International Mobile Subscriber Identity
LTE Long Term Evolution
MME Mobility Management Entity
ms Millisecond
MTC Machine Type Communication
NAS Non-Access Stratum
OFDM Orthogonal Frequency Division Multiplexing
PCA Principle Component Analysis
PCH Paging Channel
PDCCH Physical Downlink Control Channel
PDN Packet Data Network
PDSCH Physical Downlink Shared Channel
PF Paging Frame
P-GW Packet Data Network Gateway
PO Paging Occasion
P-RNTI Paging Radio Network Temporary Identifier
RAN Radio Access Network
RRC Radio Resource Control
RRH Remote Radio Head
SCEF Service Capability Exposure Function
SC-FDMA Single Carrier Frequency Division Multiple Access
SFN System Frame Number
S-GW Serving Gateway
TAU Tracking Area Update
TS Technical Specification
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a network node, comprising:

assigning paging occasions to a plurality of User Equipments, UEs, in accordance with one or more anti-affinity groups such that, for a defined time interval, paging occasions within the defined time interval are assigned to UEs in a same anti-affinity group; and notifying the plurality of UEs of the paging occasions assigned to the UEs, where:

the plurality of UEs are assigned to a plurality of affinity groups such that each UE of the plurality of UEs is assigned to one of the plurality of affinity groups and each affinity group of the plurality of affinity groups comprises one or more of the plurality of UEs; and each anti-affinity group of the one or more anti-affinity groups is a group of N affinity groups of the plurality of affinity groups such that, over the defined time interval, the anti-affinity group satisfies the following:

$$\sum_{i=1}^{N} N_i P(g_i \mid g_{N\setminus i}) < A \sum_{i=1}^{N} N_i$$

where N is a number of affinity groups in the anti-affinity group, $N_i$ is a number of paging occasions assigned to the i-th affinity group within the defined time interval, $P(g_i|g_{N\setminus i})$ is a probability of a paging message in the defined time interval for the i-th affinity group given that a paging message for any of the other N affinity groups also occurs in the defined time interval, and A is an anti-affinity threshold and is less than 1.

2. The method of claim 1 wherein the anti-affinity threshold is less than or equal to 0.9.

3. The method of claim 1 wherein the anti-affinity threshold is less than or equal to 0.75.

4. The method of claim 1 wherein the anti-affinity threshold is less than or equal to 0.5.

5. The method of claim 1 wherein the defined time interval is n times a discontinuous reception ON duration that is common for the plurality of UEs, and n≥1.

6. The method of claim 1 wherein the plurality of affinity groups are based on one or more attributes related to the plurality of UEs.

7. The method of claim 6 wherein the one or more attributes comprise at least one of a group consisting of: traffic arrival distribution function, one or more traffic arrival parameters, network characteristics, network capabilities, device type, device capabilities, Machine Type Communication, MTC, application, and device mobility characteristics.

8. The method of claim 1 further comprising:
obtaining profiles and/or capabilities of the plurality of UEs; and
assigning the plurality of UEs to the plurality of affinity groups based on the profiles and/or capabilities of the plurality of UEs.

9. The method of claim 1 wherein the plurality of UE(s) comprises a plurality of Machine Type Communication, MTC, devices.

10. A network node, comprising:
at least one processor;
memory storing instructions executable by the at least one processor whereby the network node is operable to:
assign paging occasions to a plurality of User Equipments, UEs, in accordance with one or more anti-affinity groups such that, for a defined time interval, paging occasions within the defined time interval are assigned to UEs in a same anti-affinity group; and
notify the plurality of UEs of the paging occasions assigned to the UEs, where:
the plurality of UEs are assigned to a plurality of affinity groups such that each UE of the plurality of UEs is assigned to one of the plurality of affinity groups and each affinity group of the plurality of affinity groups comprises one or more of the plurality of UEs;
each anti-affinity group of the one or more anti-affinity groups is a group of N affinity groups of the plurality of affinity groups such that, over the defined time interval, the anti-affinity group satisfies the following:

$$\sum_{i=1}^{N} N_i P(g_i \mid g_{N \setminus i}) < A \sum_{i=1}^{N} N_i$$

where N is a number of affinity groups in the anti-affinity group, $N_i$ is a number of paging occasions assigned to the i-th affinity group within the defined time interval, $P(g_i \mid g_{N \setminus i})$ is a probability of a paging message in the defined time interval for the i-th affinity group given that a paging message for any of the other N affinity groups also occurs in the defined time interval, and A is an anti-affinity threshold and is less than 1.

11. The network node of claim 10 wherein the anti-affinity threshold is less than or equal to 0.9.

12. The network node of claim 10 wherein the anti-affinity threshold is less than or equal to 0.75.

13. The network node of claim 10 wherein the anti-affinity threshold is less than or equal to 0.5.

14. The network node of claim 10 wherein the defined time interval is n times a discontinuous reception ON duration that is common for the plurality of UEs, and n≥1.

15. The network node of claim 10 wherein the plurality of affinity groups are based on one or more attributes related to the plurality of UEs.

16. The network node of claim 15 wherein the one or more attributes comprise at least one of a group consisting of: traffic arrival distribution function, one or more traffic arrival parameters, network characteristics, network capabilities, device type, device capabilities, Machine Type Communication, MTC, application, and device mobility characteristics.

17. The network node of claim 10 wherein the network node is further operable to:
obtain profiles and/or capabilities of the plurality of UEs; and
assign the plurality of UEs to the plurality of affinity groups based on the profiles and/or capabilities of the plurality of UEs.

18. The network node of claim 10 wherein the plurality of UE(s) comprises a plurality of Machine Type Communication, MTC, devices.

19. A network node adapted to:
assign paging occasions to a plurality of User Equipments, UEs, in accordance with one or more anti-affinity groups such that, for a defined time interval, paging occasions within the defined time interval are assigned to UEs in a same anti-affinity group; and
notify the plurality of UEs of the paging occasions assigned to the UEs, where:
the plurality of UEs are assigned to a plurality of affinity groups such that each UE of the plurality of UEs is assigned to one of the plurality of affinity groups and each affinity group of the plurality of affinity groups comprises one or more of the plurality of UEs;
each anti-affinity group of the one or more anti-affinity groups is a group of N affinity groups of the plurality of affinity groups such that, over the defined time interval, the anti-affinity group satisfies the following:

$$\sum_{i=1}^{N} N_i P(g_i \mid g_{N \setminus i}) < A \sum_{i=1}^{N} N_i$$

where N is a number of affinity groups in the anti-affinity group, $N_i$ is a number of paging occasions assigned to the i-th affinity group within the defined time interval, $P(g_i \mid g_{N \setminus i})$ is a probability of a paging message in the defined time interval for the i-th affinity group given that a paging message for any of the other N affinity groups also occurs in the defined time interval, and A is an anti-affinity threshold and is less than 1.

* * * * *